US012577911B2

(12) United States Patent

Nasr et al.

(10) Patent No.: US 12,577,911 B2
(45) Date of Patent: Mar. 17, 2026

(54) PARTICLE SEPARATION SYSTEM UPSTREAM OF A HEAT EXCHANGER IN A GAS TURBINE ENGINE

(71) Applicant: General Electric Company, Schenectady, NY (US)

(72) Inventors: Hojjat Nasr, West Chester, OH (US); Michael Vadnais, Delafield, WI (US); Ryan St. Pierre, Jacksonville, FL (US); Jeffrey D. Rambo, Mason, OH (US)

(73) Assignee: General Electric Company, Evendale, OH (US)

( * ) Notice: Subject to any disclaimer, the term of this patent is extended or adjusted under 35 U.S.C. 154(b) by 8 days.

(21) Appl. No.: 18/588,635

(22) Filed: Feb. 27, 2024

(65) Prior Publication Data

US 2025/0270956 A1 Aug. 28, 2025

(51) Int. Cl.
| | |
|---|---|
| *F02C 7/052* | (2006.01) |
| *F02C 7/14* | (2006.01) |
| *F28D 21/00* | (2006.01) |
| *F28F 19/01* | (2006.01) |

(52) U.S. Cl.
CPC ................ *F02C 7/052* (2013.01); *F02C 7/14* (2013.01); *F28F 19/01* (2013.01); *F05D 2260/213* (2013.01); *F05D 2260/607* (2013.01); *F28D 2021/0026* (2013.01)

(58) Field of Classification Search
CPC .... F02C 7/14; F02C 7/141; F02C 7/16; F02C 7/18; F02C 7/047; F02C 7/05; F02C 7/052; F02C 7/055; F28D 2021/0021; F28D 2021/026; F28F 19/01
See application file for complete search history.

(56) References Cited

U.S. PATENT DOCUMENTS

| | | | | | |
|---|---|---|---|---|---|
| 3,329,377 | A | * | 7/1967 | Gudmundur | F02C 7/05 55/306 |
| 3,421,296 | A | * | 1/1969 | Beurer, Sr. | F02C 7/052 55/306 |
| 3,449,891 | A | * | 6/1969 | Shohet | B01D 45/16 55/306 |

(Continued)

OTHER PUBLICATIONS

Vincké et al., "Description of an Air-Oil Test Set-Up for ACOC Heat Exchangers Testing," 9th European Conference for Aeronautics and Space Sciences (2021).

*Primary Examiner* — Alain Chau
(74) *Attorney, Agent, or Firm* — Hanley, Flight & Zimmerman, LLC

(57) ABSTRACT

A particle separation system includes at least one inertial particle separator spaced apart from or integrated as a unitary piece with a heat exchanger. The at least one inertial particle separator is disposed upstream of the heat exchanger. The at least one inertial particle separator is configured and arranged to direct a first fluid flow containing a first amount of particles to an inner passage provided at a hub of the heat exchanger, an outer passage provided at a tip of the heat exchanger, or both, the hub and the tip being located at a radial periphery of the heat exchanger, and to direct a second fluid flow containing a second amount of particles to a central portion of the heat exchanger to cool down a fluid circulating within the heat exchanger. The second amount of particles is substantially less than the first amount of particles.

13 Claims, 12 Drawing Sheets

(56) References Cited

U.S. PATENT DOCUMENTS

| | | | | |
|---|---|---|---|---|
| 4,346,860 | A * | 8/1982 | Tedstone ................ | B64D 33/02 |
| | | | | 55/306 |
| 4,704,145 | A * | 11/1987 | Norris ..................... | F02C 7/052 |
| | | | | 55/440 |
| 4,782,658 | A * | 11/1988 | Perry ........................ | F02C 7/14 |
| | | | | 60/39.08 |
| 9,310,120 | B2 | 4/2016 | Cerdan | |
| 9,410,482 | B2 | 8/2016 | Krautheim et al. | |
| 9,500,129 | B2 * | 11/2016 | Schmittenberg ....... | B64D 33/02 |
| 10,695,704 | B2 | 6/2020 | Mook et al. | |
| 10,830,138 | B2 | 11/2020 | Manteiga et al. | |
| 11,371,700 | B2 | 6/2022 | Prenter et al. | |
| 11,414,204 | B2 | 8/2022 | Bergami | |
| 2010/0221100 | A1 * | 9/2010 | Snyder ................... | B01D 45/02 |
| | | | | 415/121.2 |
| 2014/0119891 | A1 * | 5/2014 | Schmittenberg .......... | F02C 7/05 |
| | | | | 415/121.2 |
| 2015/0345331 | A1 * | 12/2015 | Murray ................... | F01D 25/24 |
| | | | | 60/785 |
| 2016/0146511 | A1 | 5/2016 | Hipsky et al. | |
| 2018/0216901 | A1 * | 8/2018 | Bricaud ................. | F02C 7/141 |
| 2021/0148605 | A1 | 5/2021 | Wilson et al. | |
| 2022/0120508 | A1 | 4/2022 | Theobald et al. | |

* cited by examiner

PARTICLE SEPARATION SYSTEM UPSTREAM OF A HEAT EXCHANGER IN A GAS TURBINE ENGINE

FIELD

The present disclosure relates to a particle separation system disposed upstream of a heat exchanger in a gas turbine engine.

BACKGROUND

A gas turbine engine generally includes a turbo-engine and a rotor assembly. Gas turbine engines, such as turbofan engines, may be used for aircraft propulsion. In the case of a turbofan engine, the rotor assembly may be configured as a fan assembly. Gas turbine engines generally include a thermal management system to manage thermal loads during operation of the gas turbine engine. The thermal management system includes a heat exchanger.

DETAILED DESCRIPTION

Figure 1:
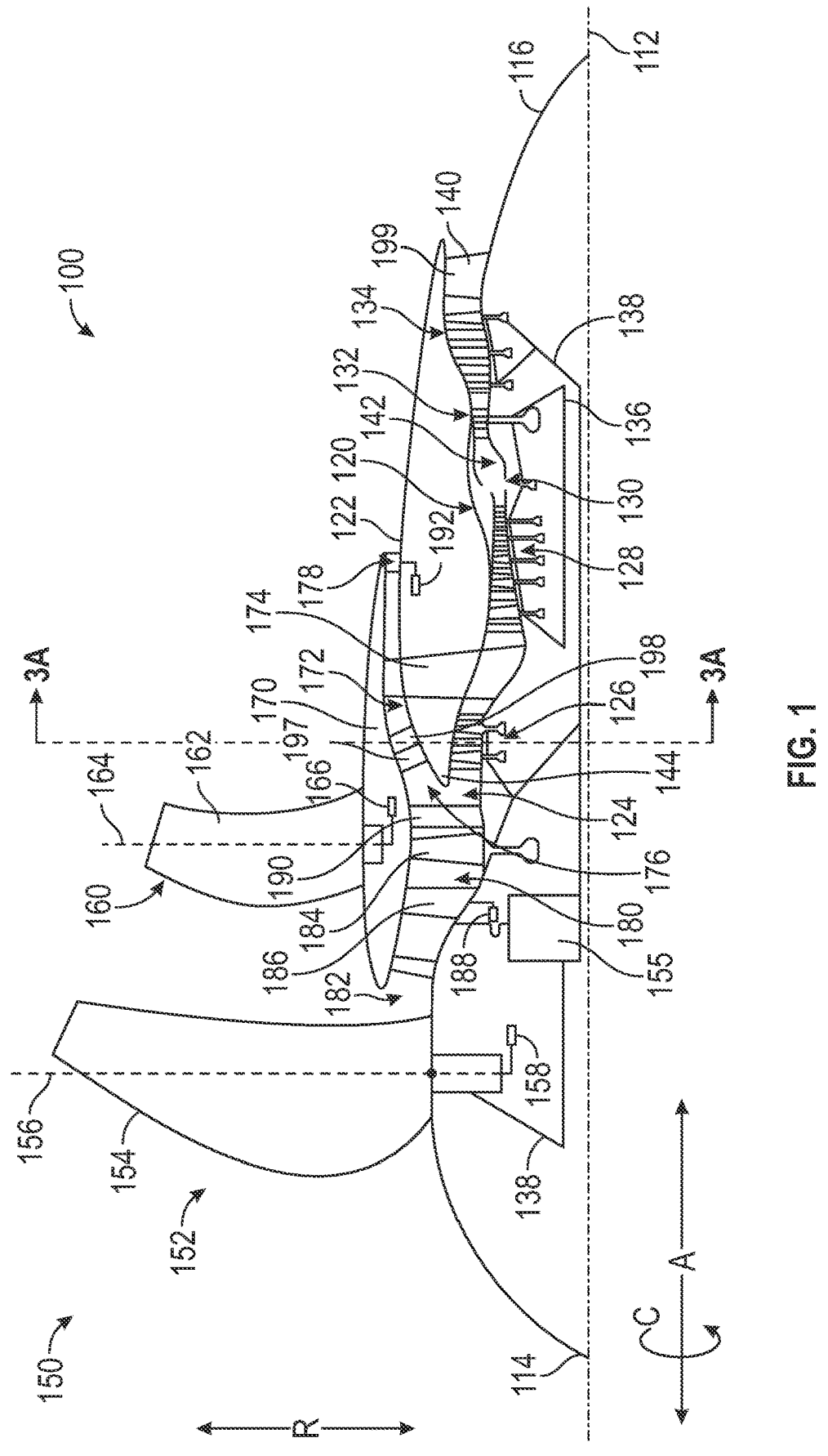
FIG. 1 is a schematic cross-sectional view of a gas turbine engine, according to embodiment of the present disclosure.

Various embodiments are discussed in detail below. While specific embodiments are discussed, this is done for illustration purposes only. A person skilled in the relevant art will recognize that other components and configurations may be used without departing from the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and the description have been used to refer to like or similar parts of the disclosure.

Generally, a turbofan engine includes a fan and a turbo-engine, with the turbo-engine rotating the fan to generate thrust. The turbo-engine includes a compressor section, a combustion section, a turbine section, and an exhaust section and defines a working gas flowpath therethrough.

Within the turbofan engine, thermal management is used to ensure the turbofan engine operates as desired or intended, without allowing certain components to exceed temperature thresholds. For example, a thermal management system of the turbofan engine may operate to reduce a temperature of a lubrication oil (used, e.g., for various bearings and gears within the turbofan engine), a cooled cooling air, electronics systems, etc., during operation of the turbofan engine. The thermal management system may utilize a thermal fluid and a heat exchanger to transfer heat from a heat source to a heat sink.

Generally, it is desirable to operate the thermal fluid and heat exchanger to enhance heat transfer properties of a thermal fluid to cool down a lubricant fluid (e.g., oil). However, when the heat exchanger is utilized within a working gas flow path of a turbofan engine, particles (e.g., dust particles, aerosol particles) within the gas flow (airflow) may create blockage of the air flow when passing through the heat exchanger. In addition, deposition of the particles on surfaces of the heat exchanger may be detrimental to heat transfer properties of the heat exchanger, as deposited dust particles have low thermal conductivity compared to metal.

The present disclosure provides a particle separator upstream of the heat exchanger heat exchanger, for example, upstream of plate-fin portions of the heat exchanger. The particle separator redirects dispersed particles (e.g., dust particles, aerosol particles) in the airflow to inner and/or outer passages of the heat exchanger so that the majority of a core of the heat exchanger remains particle-free. Redirecting the particles to inner and outer passages of the heat exchanger can provide many benefits, including:

(1) Flow into the heat exchanger may have various radial profiles resulting from upstream turbomachinery airfoils, variable geometry features, and change in engine operating power and/or airflow. Variation in flow velocity and pressure in the engine direction can result in the accompanying particles being directed to different radial locations of the heat exchanger.

(2) The inner and outer passages of the heat exchanger may not contribute to the total heat transfer as strongly as the central passages and thus can be used as a path to pass through the particles.

(3) Fins of the heat exchanger in inner and outer passages are in general shorter or have a shorter length than fins within the core of the heat exchanger (due to mechanical tolerances with respect to casing) and can have lower heat exchange effectiveness as the fins are connected to one plate rather than two.

The particle separator upstream and the heat exchanger heat exchanger can be provided in an annular configuration or a non-annular configuration, as will be described in further detail in the following paragraphs.

FIG. 1 is a schematic cross-sectional view of a gas turbine engine 100, according to embodiment of the present disclosure. FIG. 1 shows the gas turbine engine 100 (e.g., a turbofan engine) having a rotor assembly with a single stage of unducted rotor blades. In such a manner, the rotor assembly may be referred to herein as an "unducted fan," or the entire gas turbine engine 100 may be referred to as an "unducted turbofan engine." In addition, the gas turbine engine 100 of FIG. 1 includes a first stream corresponding to a primary airflow passing through a fan 152, a second stream flowing through a core duct 142 (e.g., a working gas flowpath through a turbo-engine 120), and a third stream extending from the compressor section to a rotor assembly flowpath over the turbo-engine, as will be explained in more detail below. The "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or a propeller driven propulsion stream). The thrust may be produced through a dedicated nozzle or through mixing of an airflow through the third stream with a primary propulsion stream or a core air stream, e.g., into a common nozzle.

The gas turbine engine 100 defines an axial direction A, a radial direction R, and a circumferential direction C. The gas turbine engine 100 defines an axial centerline or a longitudinal centerline axis 112 that extends along the axial direction A. The axial direction A extends parallel to the longitudinal centerline axis 112. The radial direction R extends outward from and inward to the longitudinal centerline axis 112 in a direction orthogonal to the axial direction A. The circumferential direction extends three hundred sixty degrees around the axial direction A. The gas turbine engine 100 extends between a forward end 114 and an aft end 116, e.g., along the axial direction A.

The gas turbine engine 100 includes a turbo-engine 120 and a rotor assembly or a fan section 150, positioned upstream thereof. Generally, the turbo-engine 120 includes, in serial flow order, a compressor section, a combustion section, a turbine section, and an exhaust section. The turbo-engine 120 includes a core cowl 122 that defines an annular core inlet 124. The core cowl 122 encloses at least in part a low pressure system and a high pressure system. For example, the core cowl 122 encloses and supports at least in part a booster or a low-pressure compressor (LPC) 126 for pressurizing the air that enters the turbo-engine 120 through the annular core inlet 124. A high pressure, multi-stage, axial-flow compressor (HPC) 128 receives pressurized air from the LPC 126 and further increases the pressure of the air. The pressurized air stream flows downstream to a combustor 130 of the combustion section where fuel is injected into the pressurized air stream and ignited to raise the temperature of the pressurized air.

The terms "high/low pressure" are relative terms and are used with respect to the LPC and HPC systems. Therefore, the terms "high" and "low" are used in this same context to distinguish the two systems, and are not meant to imply any absolute pressure values.

The high energy combustion products flow from the combustor 130 downstream to a high-pressure turbine (HPT) 132. The HPT 132 drives the HPC 128 through a high-pressure shaft 136. The HPT 132 is drivingly coupled with the HPC 128. The hot combustion products then flow to a low-pressure turbine (LPT) 134. The LPT 134 drives the LPC 126 and components of the fan section 150 through a low-pressure shaft 138. The LPT 134 is drivingly coupled with the LPC 126 and components of the fan section 150. In the present embodiment, the low-pressure shaft 138 is coaxial with the high-pressure shaft 136. The combustion products that drive each of the HPT 132 and LPT 134 exit the turbo-engine 120 through a turbo-engine exhaust nozzle 140.

Accordingly, the turbo-engine 120 defines a working gas flowpath or a core duct 142 that extends between the annular core inlet 124 and the turbo-engine exhaust nozzle 140. The core duct 142 is an annular duct positioned generally inward of the core cowl 122 along the radial direction R. The core duct 142 (e.g., a working gas flowpath through the turbo-engine 120) may be referred to as a second stream. The first stream corresponds to the primary airflow passing through the fan 152.

The fan section 150 includes a fan 152, which is the primary fan in this embodiment. For the embodiment of FIG. 1, the fan 152 is an open rotor or an unducted fan 152. In such a manner, the gas turbine engine 100 may be referred to as an open rotor or an unducted fan engine.

As depicted, the fan 152 includes a plurality of fan blades 154 (only one shown in FIG. 1). The plurality of fan blades 154 are rotatable, e.g., about the longitudinal centerline axis 112. As noted above, the fan 152 is drivingly coupled with the LPT 134 via the low-pressure shaft 138. As shown in FIG. 1, the fan 152 is coupled with the low-pressure shaft 138 via a speed reduction gearbox 155, e.g., in an indirect-drive or a geared-drive configuration.

Moreover, the plurality of fan blades 154 can be arranged in equal spacing around the longitudinal centerline axis 112. Each fan blade in the plurality of fan blades 154 has a root and a tip, and a span defined therebetween. Each fan blade in the plurality of fan blades 154 has a central blade axis 156. Each fan blade in the plurality of fan blades 154 of the fan 152 is rotatable about its central blade axis 156, e.g., in unison with one another. One or more actuators 158 are provided to facilitate such rotation and, therefore, may be used to change a pitch of the plurality of fan blades 154 about their respective central blades' axes 156.

The fan section 150 further includes a fan guide vane array 160 that includes a plurality of fan guide vanes 162 (only one shown in FIG. 1) disposed around the longitudinal centerline axis 112. The plurality of fan guide vanes 162 are not rotatable about the longitudinal centerline axis 112. Each fan guide vane in the plurality of fan guide vanes 162 has a root and a tip, and a span defined therebetween. The plurality of fan guide vanes 162 may be unshrouded as shown in FIG.

1 or, alternatively, may be shrouded, e.g., by an annular shroud spaced outward from the tips of the plurality of fan guide vanes 162 along the radial direction R or attached to the plurality of fan guide vanes 162.

Each fan guide vane in the plurality of fan guide vanes 162 defines a central blade axis 164. Each fan guide vane in the plurality of fan guide vanes 162 of the fan guide vane array 160 is rotatable about its respective central blade axis 164, e.g., in unison with one another. One or more actuators 166 are provided to facilitate such rotation and, therefore, may be used to change a pitch of each fan guide vane in the plurality of fan guide vanes 162 about its respective central blade axis 164. However, in other embodiments, each fan guide vane in the plurality of fan guide vanes 162 may be fixed or unable to be pitched about its central blade axis 164. The plurality of fan guide vanes 162 are mounted to the fan cowl 170. The fan cowl 170 is, generally, provided radially outer of the core cowl 122.

As shown in FIG. 1, in addition to the fan 152, which is unducted, a ducted fan 184 is included aft of the fan 152, such that the gas turbine engine 100 includes both a ducted fan and an unducted fan that both serve to generate thrust through the movement of air without passage through at least a portion of the turbo-engine 120 (e.g., without passage through the HPC 128 and combustion section in the depicted embodiment). The ducted fan 184 is rotatable about the same axis (e.g., the longitudinal centerline axis 112) as the fan blade 154. The ducted fan 184 is driven by the LPT 134 (e.g., coupled to the low-pressure shaft 138). The unducted fan 152 may be referred to as the primary fan, and the ducted fan 184 may be referred to as a secondary fan. These terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal centerline axis 112. Each blade of the ducted fan 184 has a root and a tip, and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or, simply, a fan duct 172. According to this embodiment, the fan flowpath or fan duct 172 may form at least a portion of the third stream of the gas turbine engine 100 (e.g., another working gas flowpath of the gas turbine engine 100).

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, stationary struts 174 that are circumferentially-spaced (only one shown in FIG. 1). The stationary struts 174 may each be aerodynamically contoured to direct air flowing thereby. Other struts in addition to the stationary struts 174 may be used to connect and to support the fan cowl 170 and/or the core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The gas turbine engine 100 also defines or includes an inlet duct 180. The inlet duct 180 extends between the engine inlet 182 and the annular core inlet 124 or fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or a leading edge 144 of the core cowl 122. In the embodiment depicted, the inlet duct 180 is wider than the core duct 142 along the radial direction R. The inlet duct 180 is also wider than the fan duct 172 along the radial direction R.

The gas turbine engine 100 of FIG. 1 includes the first stream corresponding to a primary airflow passing through a fan 152, the second stream flowing through a core duct 142 (e.g., a working gas flowpath through a turbo-engine 120), and the third stream extending from the compressor section to a rotor assembly flowpath over the turbo-engine. The gas turbine engine 100 includes one or more features to increase an efficiency of the third stream thrust (e.g., a thrust generated by an airflow through the fan duct 172 exiting through the fan exhaust nozzle 178, generated at least in part by the ducted fan 184). The gas turbine engine 100 further includes an array of inlet guide vanes 186 positioned in the inlet duct 180 upstream of the ducted fan 184 and downstream of the engine inlet 182. The array of inlet guide vanes 186 are arranged around the longitudinal centerline axis 112. In this embodiment, the inlet guide vanes 186 are not rotatable about the longitudinal centerline axis 112. Each of the inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and, therefore, may be used to change a pitch of the inlet guide vanes 186 about their respective central blade axes. Alternatively, in other embodiments, each inlet guide vanes 186 may be fixed or unable to be pitched about its central blade axis.

The gas turbine engine 100 includes a plurality of outlet guide vanes 190 located downstream of the ducted fan 184 and upstream of the fan duct inlet 176. As with the plurality of inlet guide vanes 186, the plurality of outlet guide vanes 190 are not rotatable about the longitudinal centerline axis 112. However, in the embodiment depicted in FIG. 1, unlike the plurality of inlet guide vanes 186, the plurality of outlet guide vanes 190 are configured as fixed-pitch outlet guide vanes.

The fan exhaust nozzle 178 of the fan duct 172 is further configured as a variable geometry exhaust nozzle. In such a manner, the gas turbine engine 100 includes one or more actuators 192 for modulating the fan exhaust nozzle 178. For example, the fan exhaust nozzle 178 may be configured to vary a total cross-sectional area (e.g., an area of the nozzle in a plane perpendicular to the longitudinal centerline axis 112) to modulate an amount of thrust generated based on one or more engine operating conditions (e.g., temperature, pressure, mass flowrate, etc., of an airflow through the fan duct 172). A fixed geometry exhaust nozzle may also be adopted.

The combination of the plurality of inlet guide vanes 186 located upstream of the ducted fan 184, the plurality of outlet guide vanes 190 located downstream of the ducted fan 184, and the fan exhaust nozzle 178 may result in a more efficient generation of third stream thrust during one or more engine operating conditions. In addition, by introducing a variability in the geometry of the inlet guide vanes 186 and the fan exhaust nozzle 178, the gas turbine engine 100 may be capable of generating more efficient third stream thrust across a relatively wide array of engine operating conditions, including takeoff and climb (when a higher total engine thrust, is generally needed) as well as cruise (when a lesser amount of total engine thrust, is generally needed).

Moreover, referring still to FIG. 1, in exemplary embodiments, air passing through the fan duct 172 may be relatively cooler (e.g., at a lower temperature) than one or more fluids utilized in the turbo-engine 120. In this way, one or more heat exchangers 198 are positioned in thermal communication with the fan duct 172. For example, one or more heat exchanger 198 are disposed within the fan duct 172 and utilized to cool one or more fluids from the core engine with the air passing through the fan duct 172, as a resource for removing heat from the one or more fluids (e.g., compressor bleed air, oil, fuel, etc.).

Although not depicted, the heat exchanger 198 may be an annular heat exchanger extending substantially three hundred sixty (360) degrees in the fan duct 172 (e.g., at least three hundred (300) degrees, such as at least three hundred thirty (330) degrees). In such a manner, the heat exchanger 198 may effectively utilize the air passing through the fan duct 172 to cool one or more systems of the gas turbine engine 100 (e.g., lubrication oil systems, compressor bleed air, electrical components, etc.). The heat exchanger 198 uses the air passing through the fan duct 172 as a heat sink and correspondingly increases the temperature of the air downstream of the heat exchanger 198 and exiting the fan exhaust nozzle 178.

The gas turbine engine 100 in FIG. 1 is depicted by way of example only. In other exemplary embodiments, the gas turbine engine 100 may have any other suitable configuration. For example, in other embodiments, the gas turbine engine 100 may be configured as a ducted gas turbine engine (e.g., including a nacelle surrounding the fan 152), may be a direct drive gas turbine engine (e.g., driving the fan 152 without use of a speed reduction gearbox 155), etc.

In addition, although the heat exchanger 198 is depicted positioned in the fan duct 172, in other exemplary embodiments, the gas turbine engine 100 may additionally or alternatively include a heat exchanger 199 in the turbo-engine exhaust nozzle 140, or at other suitable or desired locations.

The gas turbine engine 100 also includes a particle separation system 197 disposed upstream of the heat exchanger 198. The heat exchanger 198 and the particle separation system 197 are provided in an annular configuration where both the heat exchanger 198 and the particle separation system 197 are annular and located at a radial position relative to the longitudinal centerline axis 112 and extend circumferentially in the circumferential direction C around the longitudinal centerline axis 112. The structure and function of the particle separation system 197 will be described in further detail in the following paragraphs.

Figure 2A:
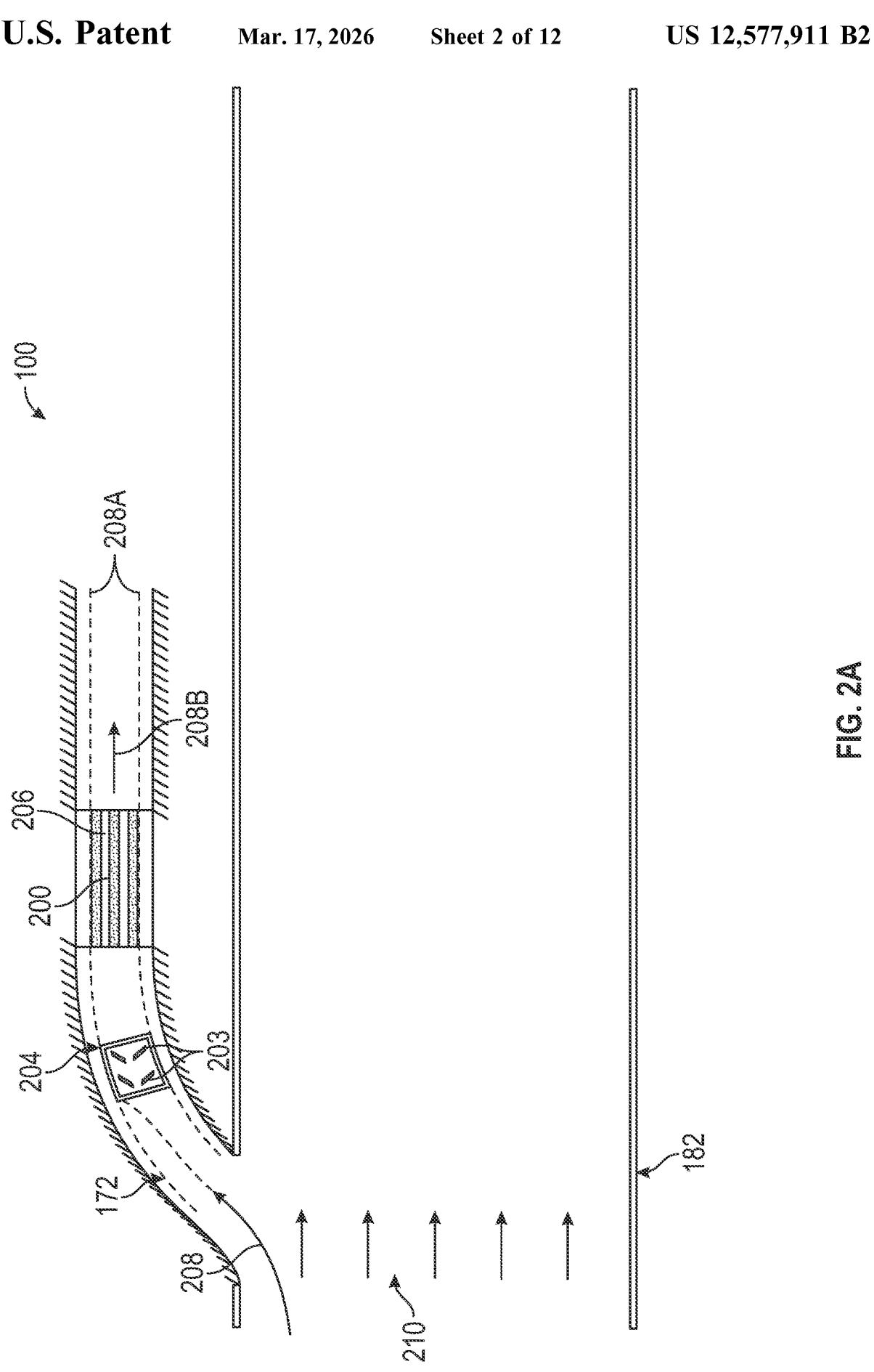
FIG. 2A shows a location of a heat exchanger and a particle separation system within a fan duct of the gas turbine engine, according to an embodiment of the present disclosure.

FIG. 2A shows a location of a heat exchanger 200 along with a particle separation system 204 within the fan duct 172 of the gas turbine engine 100, according to an embodiment of the present disclosure. The particle separation system 204 can be used as the particle separation system 197 in the gas turbine engine 100. In an embodiment, the particle separation system 204 includes one or more louvers 203 (one or more inertial particle separator). As described in the above paragraphs, the heat exchanger 200 can be positioned in thermal communication with the fan duct 172. The heat exchanger 200 disposed within the fan duct 172 is utilized to cool down one or more fluids 206 from the core engine with incoming airflow 208 passing through the fan duct 172, as a resource for removing heat from the one or more fluids 206 (e.g., compressor bleed air, oil, fuel, etc.). The one or more fluids 206 (e.g., oil) circulates within the heat exchanger 200 and the incoming airflow 208 passing through the heat exchanger 200, 202 cools down the one or more fluids 206 (e.g., oil). A temperature of the one or more fluids 206 is greater than a temperature of the incoming airflow 208. The incoming airflow 208 is a portion of airflow 210 passing through the engine inlet 182 (shown in FIG. 1). The heat exchanger 200 can be similar to the heat exchanger 198 shown in FIG. 1.

In an embodiment, the particle separation system 204 can be provided upstream of the heat exchanger 200. In an embodiment, the particle separation system 204 is configured to divide the incoming airflow 208 incident on the particle separation system 204 into a first airflow 208A containing a first amount of particles and a second airflow 208B containing substantially no particles or a second amount of particles that is substantially less than the first amount of particles. The particle separation system 204 is configured to direct the first airflow 208A towards a radial periphery of the fan duct 172 so that the particles in the first airflow 208A pass through edges of the heat exchanger 202 substantially unhindered by the heat exchanger 200 and the second airflow 208B containing substantially less or no particles pass through a central portion of the heat exchanger 200 to cool down the one or more fluids 206 circulating within the heat exchanger 200. As a result, a majority of particles are separated from the incoming airflow 208 to obtain the second airflow 208B containing substantially fewer particles. In an embodiment, the particle separation system 204 is a mechanical device, having, for example, one or more louvers 203 that are configured and arranged to deviate the particles in the incoming airflow 208. An airflow with "substantially no or fewer particles" is to be understood as an airflow containing "less than about 80%" of an original concentration of particles in the incoming airflow 208. "Concentration of particles" is understood to mean either mass or volume concentration of particles. The first amount of particles in the first airflow 208A may have be a concentration of particles greater than about 80% of a concentration of particles in the incoming airflow 208 while the second amount of particles in the second airflow 208B may have a concentration of particles less than about 20% of the of the original concentration of particles in the incoming airflow 208. The first amount of particles (with a concentration of particles greater than 80%) is substantially greater than the second amount of particles (with a concentration of particles less than 20%).

The particles may include, but are not limited to, aerosol particles, sand particles, ice particles, dust, foreign object debris (FOD), etc. The particles can have an average size between about one (1) micron and about one (1) millimeter (e.g., between about 5 microns and about one hundred (100) microns).

Figure 2B:
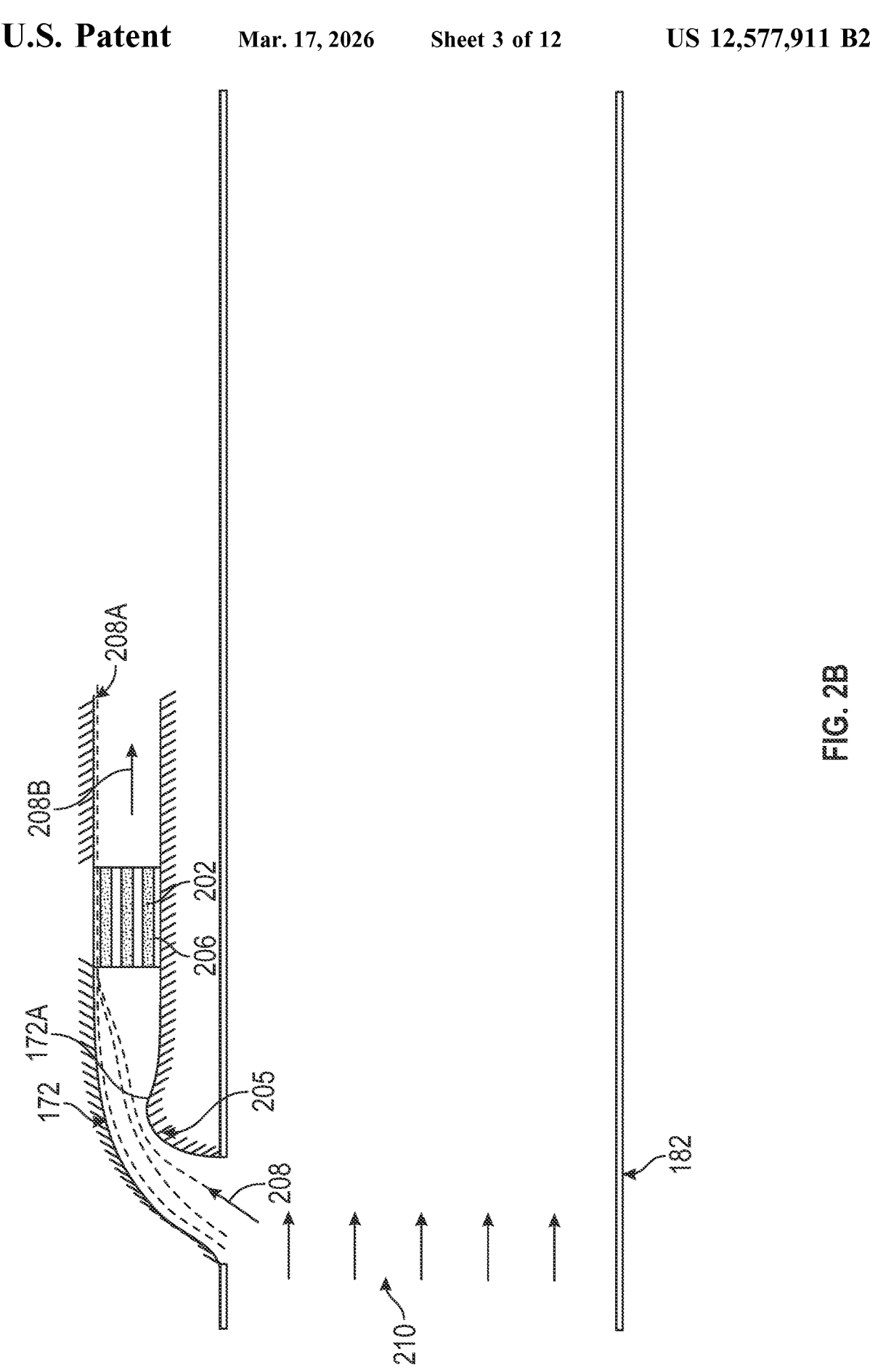
FIG. 2B shows a location of a heat exchanger along with a particle separation system within the fan duct of the gas turbine engine, according to another embodiment of the present disclosure.

FIG. 2B shows a location of a heat exchanger 202 along with a particle separation system 205 within the fan duct 172 of the gas turbine engine 100, according to another embodiment of the present disclosure. The particle separation system 205 can be also used as the particle separation system 197 in the gas turbine engine 100. The particle separation system 205 (shown in FIG. 2B) can be used as the particle separation system 197 in the gas turbine engine 100 instead of, or in addition to, particle separation system 204 (shown in FIG. 2A). FIG. 2B illustrates an upstream conditioning device to direct particles towards outer strata of the flow path so the present particle separation system may be positioned accordingly to further separate those particles. Conversely, the present particle separation system may be positioned upstream of another particle separation system as a pre-conditioner. For example, the present device may be posi-tioned as shown in FIG. 2A to deflect particles to the inner and outer edges of the flow path where filters are positioned to trap the particles. As described in the above paragraphs, the heat exchanger 202 can be positioned in thermal com-munication with the fan duct 172. The heat exchanger 202 disposed within the fan duct 172 is utilized to cool down one or more fluids 206 from the core engine with incoming airflow 208 passing through the fan duct 172, as a resource for removing heat from the one or more fluids 206 (e.g., compressor bleed air, oil, fuel, etc.). The one or more fluids 206 (e.g., oil) circulates within the heat exchanger 200 and the incoming airflow 208 passing through the heat exchanger 202 cools down the one or more fluids 206 (e.g., oil). A temperature of the one or more fluids 206 is greater than a temperature of the incoming airflow 208. The incom-ing airflow 208 is a portion of airflow 210 passing through the engine inlet 182 (shown in FIG. 1). The heat exchanger 202 can be similar to the heat exchanger 198 shown in FIG. 1.

In an embodiment, the particle separation system 205 can be provided upstream of the heat exchanger 202. In an embodiment, the particle separation system 205 is config-ured to divide the incoming airflow 208 incident on the particle separation system 205 into a first airflow 208A containing a first amount of particles and a second airflow 208B containing substantially no particles or a second amount of particles that is substantially less than the first amount of particles.

In an embodiment, the particle separation system 205 is configured to deviate the first airflow 208A containing a major amount of particles towards a wall of the fan duct 172 so that the particles pass through edges of the heat exchanger 202 substantially unhindered by the heat exchanger 202 and to direct the second airflow 208B containing substantially fewer particles to pass through a central portion of the heat exchanger 202 to cool down the one or more fluids 206 circulating within the heat exchanger 202. In an embodi-ment, the particle separation system 205 can take the form of a shaped turn surface 172A (inertial particle separator) of the fan duct 172. The shaped turn surface 172A is configured and arranged so that the first airflow containing the majority of particles, and having a relatively higher momentum than the second airflow 208B having fewer or no particles, collide with the shaped turn surface 172A to deviate the first airflow 208A towards a radial periphery of the fan duct 172 and, thus, to the radial periphery of the heat exchanger 202. On the other hand, the second airflow 208B containing fewer or no particles does not collide with the shaped turn surface 172A and, thus, is not deviated and passes through a central portion of the heat exchanger 202. In an embodiment, due to the presence of a sharp turn in the flow path, particles that are more inertial than fluid particles, deviate from the flow streamlines and are thrown to the outer passage of the heat exchanger. In an embodiment, the heat exchanger 200 and the particle separation system 204 are provided in an annular configuration where both the heat exchanger 200 and the particle separation system 204 are annular and located at a radial position relative to the longitudinal centerline axis 112 and extend circumferentially in the circumferential direction C around the longitudinal centerline axis 112. In another embodiment, the heat exchanger 200 along with the particle separation system 204 can also be configured for a non-annular passage such as an offtake branch of a main airflow passage.

Figures 3A, 3B:
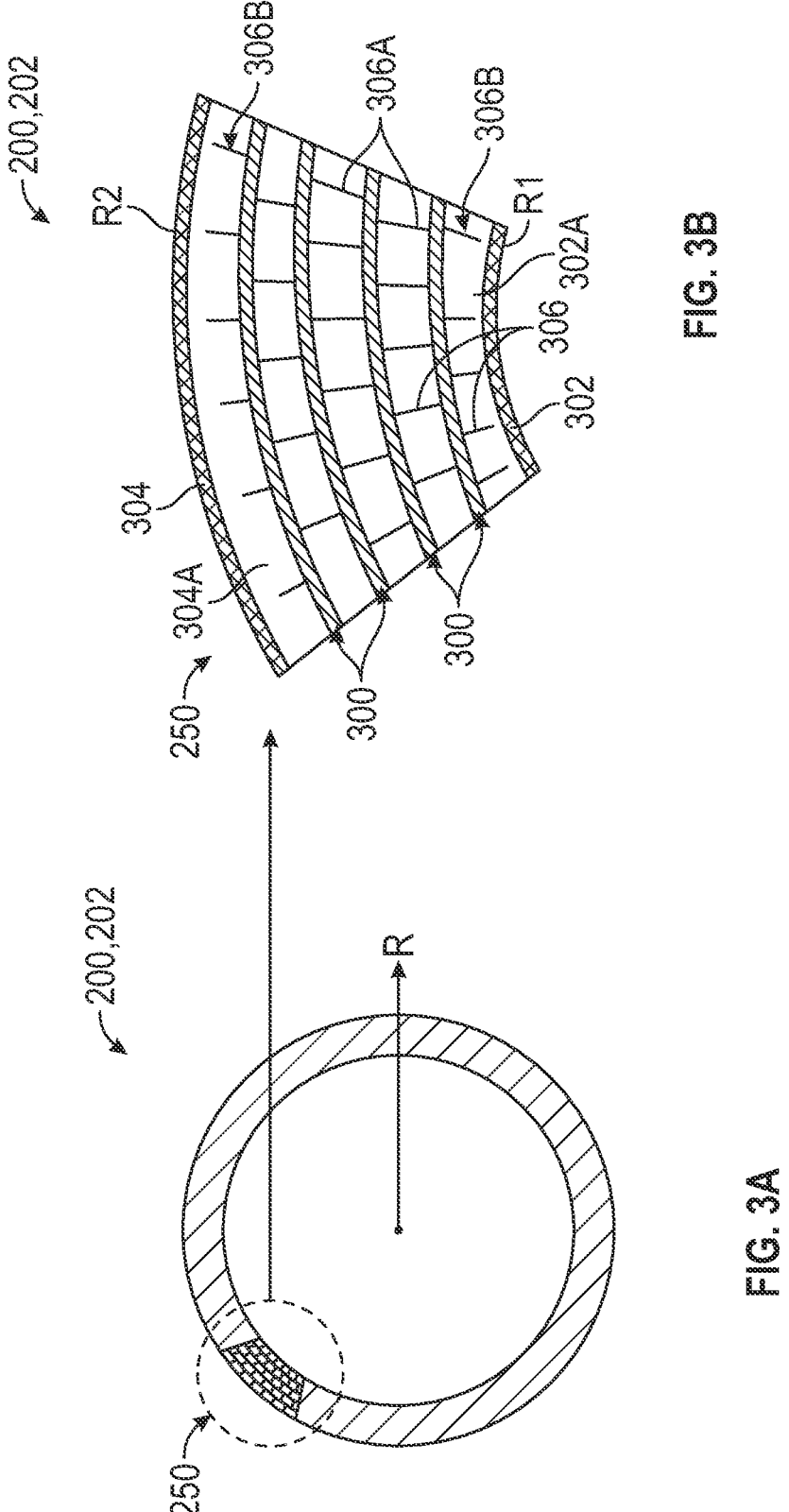
FIG. 3A is a transverse cross-sectional view of the heat exchanger taken along line 3A-3A in FIG. 1, according to an embodiment of the present disclosure.
FIG. 3B is an enlarged detailed transverse cross-sectional view of a section of the heat exchanger shown in FIG. 3A, according to an embodiment of the present disclosure.

FIG. 3A is a transverse cross-sectional view of the heat exchanger 200 and heat exchanger 202 taken along line 3A-3A of FIG. 1, FIGS. 2A, and FIG. 2B parallel to the radial direction R and perpendicular to the axial direction A (shown in FIG. 1), according to an embodiment of the present disclosure. As shown in FIG. 3A, the heat exchanger 200 and heat exchanger 202 have an annular cross section that corresponds to the annular shape of the fan duct 172. The fan duct 172 is an annular duct positioned generally outward of the core duct 142 (shown in FIG. 1) along the radial direction R.

FIG. 3B is an enlarged detailed transverse cross-sectional view of a section 250 of the heat exchanger 200 and heat exchanger 202 shown in FIG. 3A, according to an embodi-ment of the present disclosure. As shown in FIG. 3B, the heat exchanger 200 and heat exchanger 202 include a plurality of annular plates 300. The plurality of annular plates 300 are spaced apart from each other and are distrib-uted between a hub 302 located at an inner most radial position R1 and a tip 304 located at an outer most radial position R2. The heat exchanger 200 and heat exchanger 202 also include a plurality of fins 306. The plurality of fins 306 include a first plurality of fins 306A provided between the plurality of annular plates 300. In an embodiment, the first plurality of fins 306A are circumferentially spaced apart (e.g., spaced apart along the circumference C) and are coupled to the plurality of annular plates 300. The second plurality of fins 306B are located between one of the plurality of annular plates 300 and the hub 302 and between another one of the plurality of annular plates 300 and the tip 304. In an embodiment, the second plurality of fins 306B are also circumferentially spaced apart. The second plurality of fins 306B are connected to or coupled to one of the plurality of annular plates 300. The second plurality of fins 306B are not connected or coupled to the hub 302 to provide an inner passage 302A. The second plurality of fins 306B are also not coupled to the tip 304 to provide an outer passage 304A. A length of second plurality of fins 306B is less than a length of the first plurality of fins 306A. In an embodiment, the length of second plurality of fins 306B is less than a length of the first plurality of fins 306A and the second plurality of fins 306B are only connected at one end to one of the plurality of annular plates 300 so as to allow the first airflow 208A (shown in FIG. 2) containing the majority of particles to pass therethrough. In an embodiment, the first plurality of fins 306A and/or the second plurality of fins 306B can be arranged substantially parallel to each other, as shown in FIG. 3B. In another embodiment, the first plurality of fins 306A and/or the second plurality of fins 306B can be arranged in a "V" configuration or wave configuration, as shown in FIG. 4.

In an embodiment, a number of the second plurality of fins 306B per inch provided at the hub 302 and at the tip 304 of the heat exchanger 200 can be adjusted in the inner passage 302A at the hub 302 and the outer passage 304A at the tip 304 of the heat exchanger 200 to prevent blockage and mitigate particles deposition.

Figure 4:
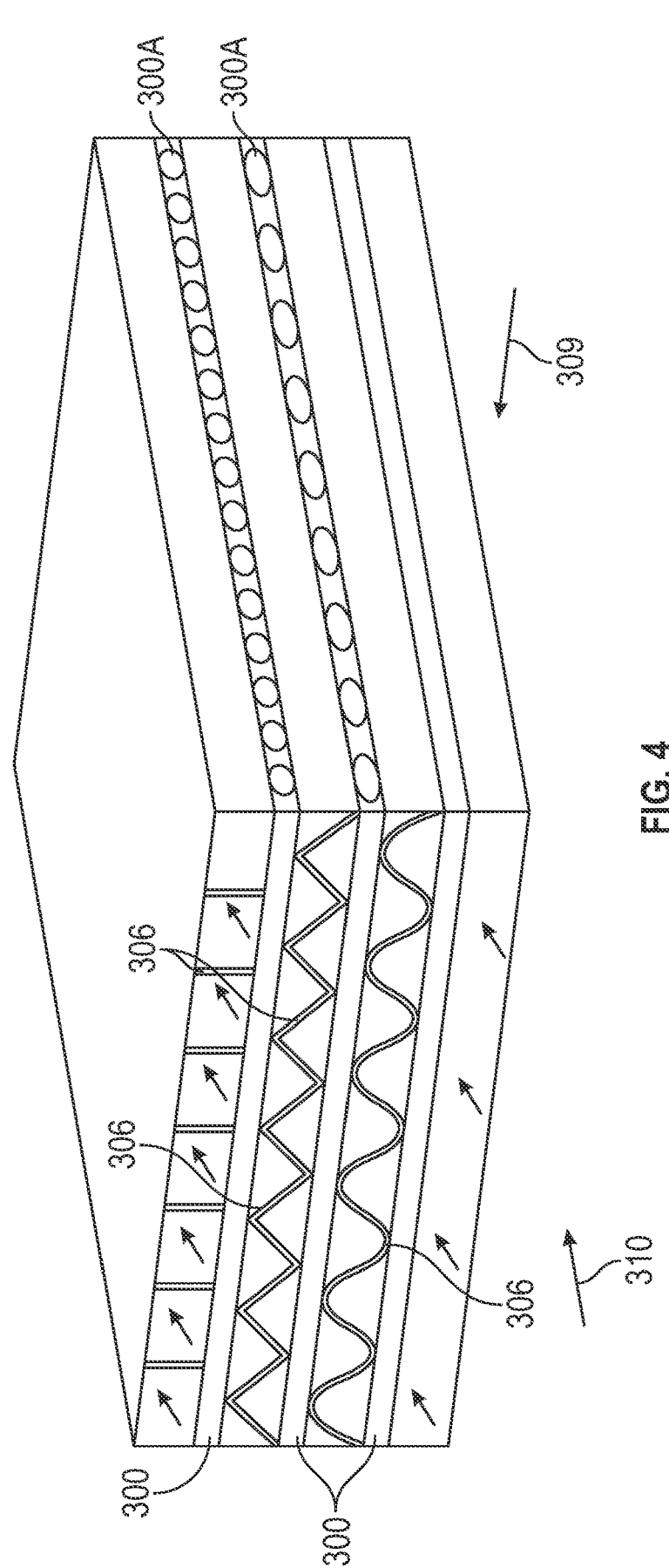
FIG. 4 is a schematic view of a section of the heat exchanger, according to an embodiment of the present disclosure.

FIG. 4 is a schematic perspective view of a section of the heat exchanger 200 or heat exchanger 202, according to an embodiment of the present disclosure. The heat exchanger 200 or heat exchanger 202 includes the plurality of annular plates 300 that are spaced apart from each other. Each of the plurality of annular plates 300 includes one or more channels 300A. The one or more channels 300A are used to circulate a fluid 309 (e.g., oil used for lubrication). The one or more channels 300A can be a plurality of channels or a single serpentine channel within each of the plurality of annular plates 300. As shown in FIG. 4, the plurality of fins 306 can be arranged parallel to each other, as shown, for example, at the upper section of the heat exchanger 200 or heat exchanger 202, or the plurality of fins 306 can also be arranged in a "V" configuration, as shown in the middle section of the heat exchanger 200 or heat exchanger 202, and/or the plurality of fins 306 can further be arranged in a wave configuration, as shown in the lower section of the heat exchanger 200 or heat exchanger 202. As shown in FIG. 4, an airflow 310 (i.e., a flow of cold fluid) is introduced between the plurality of annular plates 300 and between the plurality of fins 306 to cool down the fluid 309 that circulates within the one or more channels 300A of each of the plurality of annular plates 300. The terms "hot" and "cold" are relative terms and are used to mean that a temperature of the fluid 309 (e.g., hot fluid) is greater than a temperature of the airflow 310 (cold fluid).

Figures 5, 6:
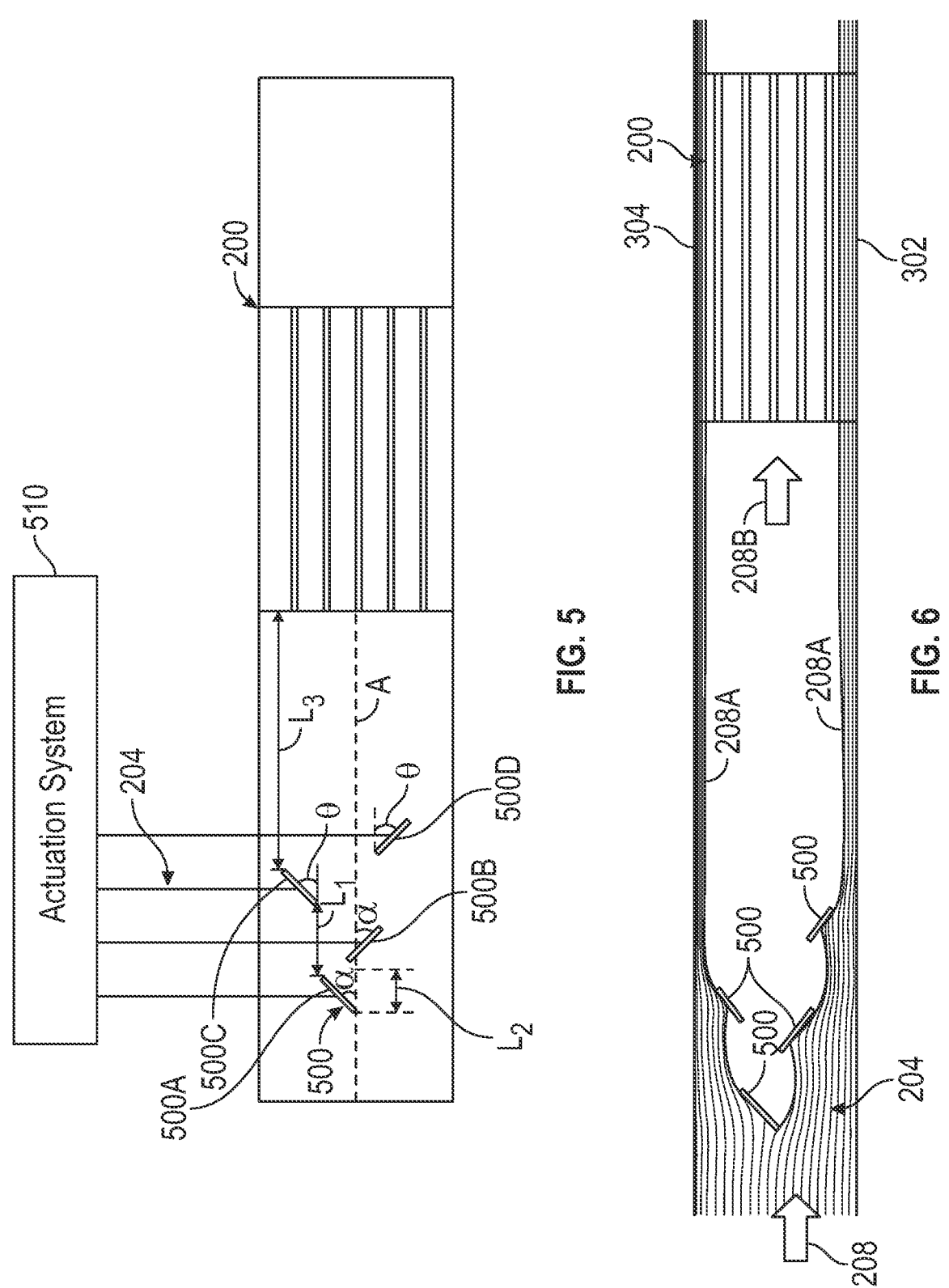
FIG. 5 is a schematic representation of the particle separation system, according to an embodiment of the present disclosure.
FIG. 6 shows a simulated trajectory of airflow containing particles around the particle separation system and the heat exchanger, according to an embodiment of the present disclosure.

FIG. 5 is a schematic representation of the particle separation system 204, according to an embodiment of the present disclosure. As shown in FIG. 5, the particle separation system 204 includes one or more louvers 500. The one or more louvers 500 are arranged in an alternating configuration such that a first louver 500A is oriented at a positive angle α relative to the axial direction A (i.e., axial direction of the heat exchanger 200), a second louver 500B is oriented at a negative angle α relative to the axial direction, a third louver 500C is oriented at a positive angle θ relative to the axial direction A, and a fourth louver 500D is oriented at a negative angle θ relative to the axial direction A, etc. In FIG. 5, four louvers 500 are shown. However, any number of louvers 500 can be used, for example, one, two, three, or more louvers can be used. In an embodiment, an upstream edge of the second louver 500B is spaced apart from an upstream edge of the first louver 500A by a distance L2, an upstream edge of the third louver 500C is spaced apart from a downstream edge of the first louver 500A by a distance L1, and a downstream edge of the third louver 500C is spaced apart from an upstream edge of the heat exchanger 200 by a distance L3. In an embodiment, the angles α and/or θ, the distances L1, L2 and/or L3 can be adjusted to enhance efficiency of separating the particles.

The one or more louvers 500 can be mounted to the heat exchanger 200 or mounted to the fan duct 172 (shown in FIGS. 1 and 2). An actuation system 510 can be provided to rotate the one or more louvers 500 (one or more inertial particle separators). In an embodiment, the angles of the louvers can be adjusted and controlled throughout the flight mission as desired. For example, the angles α and θ can be set to zero degree when fewer particles are present to minimize or reduce pressure drop.

FIG. 6 shows a simulated trajectory of airflow containing particles around the particle separation system 204 and the heat exchanger 200, according to an embodiment of the present disclosure. As shown in FIG. 6, the incoming airflow 208 containing both particles are thrown and deviated by the particle separation system 204. The particle separation system 204 is configured to deviate the first airflow 208A containing a majority of particles towards a radial periphery of the fan duct 172 so that particles in the first airflow 208A pass through edges of the heat exchanger 200 substantially unhindered by the heat exchanger 200 and direct the second airflow 208B containing substantially fewer or no particles to pass through a central portion of the heat exchanger 200 to cool down the fluid 309 circulating within the heat exchanger 200. As a result, the first airflow 208A containing the majority of particles is separated from the second airflow 208B containing substantially less particles. As a result, the particles in the first airflow 208A is deviated by the louvers 500 towards a radial periphery of the fan duct 172 and, thus, to radial periphery of the heat exchanger 200 (e.g., towards the hub 302 and the tip 304 of the heat exchanger 200). On the other hand, the second airflow 208B containing less or no particles, and having less momentum than the airflow containing the particles 208A, is not deviated by the louvers 500 and passes through a central portion of the particle separation system 204 and the central portion of the heat exchanger 200 to cool down the fluid 309 (shown in FIG. 4) circulating inside the heat exchanger 200.

Figure 7:
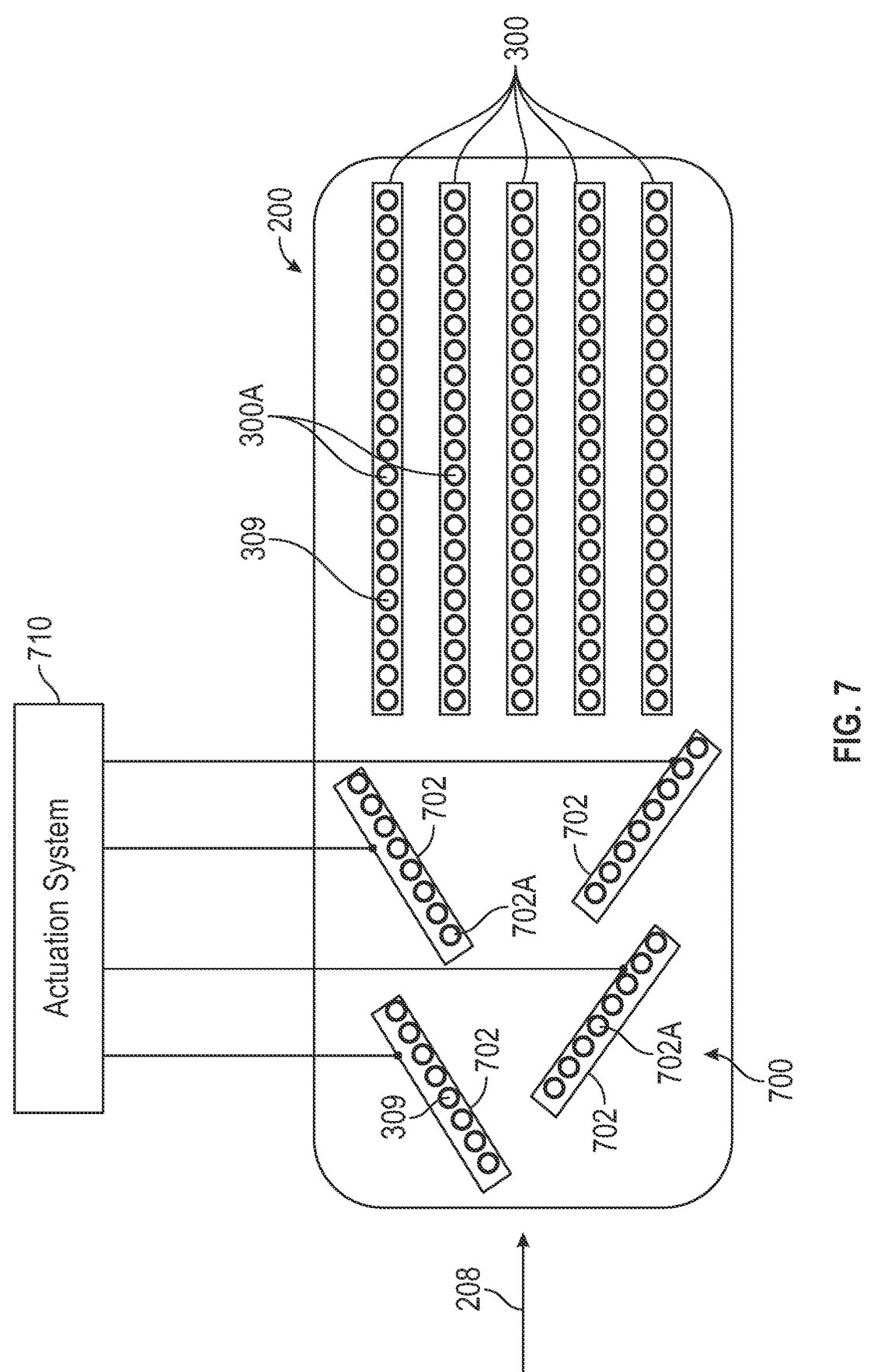
FIG. 7 is a schematic view of a particle separation system and heat exchanger shown in FIG. 2A, according to an embodiment of the present disclosure.

FIG. 7 is a schematic view of a particle separation system 700 and heat exchanger 200 shown in FIG. 2A and FIGS. 5 and 6, according to an embodiment of the present disclosure. As shown in FIG. 7, the heat exchanger 200 includes the plurality of annular plates 300 that are spaced apart from each other. Each of the plurality of annular plates 300 includes the one or more channels 300A. The one or more channels 300A are used to circulate a fluid 309. For example, the fluid 309 can be a hot fluid such as an oil used for lubrication. In addition, the particle separation system 700 includes one or more louvers 702. Each of the one or more louvers 702 also includes one or more passages 702A provided to also circulate the fluid 309. In this embodiment, the one or more louvers 702 of the particle separation system 700 can also play the role of a heat exchanger as the incoming airflow 208 can also be used to heat or cool down the fluid 309 circulating inside the one or more passages 702A of the one or more louvers 702. In addition, the one or more louvers 702 of the particle separation system 700 can also be used as an ice screen by melting ice particles in incoming airflow 208 with the fluid 309 to limit exposure of the heat exchanger 200 to ice particles. In an embodiment, the one or more louvers 702 (one or more particle separators) can be integrally manufactured (e.g., additively manufactured integral with the heat exchanger 200), mounted to the heat exchanger 200 or mounted to the fan duct 172 (shown in FIGS. 1 and 2). In another embodiment, the one or more louvers 702 can also be integrally manufactured with the heat exchanger 200 (e.g., additively manufactured to be integral with heat exchanger 200). An actuation system 710 can be provided to rotate the one or more louvers 702, for example, when the one or more louvers 702 are not rigidly fixed to the heat exchanger 200.

In an embodiment, the one or more louvers 500 (shown in FIGS. 5 and 6) and the one or more louvers 702 (shown in FIG. 7) can also be used as a foreign object damage (FOD) or own/domestic object damage (OOD or DOD) shield to mitigate the impact of foreign object debris (FOD) (e.g., ice crystals, bird parts, snarge, or remains of a bird after it has collided with a turbine engine) on the heat exchanger 200 and/or to mitigate the impact of OOD (e.g., debris originating from the turbine engine itself such as blade chip fragments or the like) on the heat exchanger 200. For example, the FOD can be directed around the heat exchanger 200 to where blockage is less impactful on the efficiency of the heat exchanger 200.

In an embodiment, the one or more louvers 500 (shown in FIGS. 5 and 6) and the one or more louvers 702 (shown in FIG. 7) can be integrated at the entrance of the heat exchanger 200 so that the energy loss that results from turning the primary airflow, can be transferred to some working fluid. The working fluid can be the same as the fluid 309 in heat exchanger 200 or part of a separate thermal transport bus. For example, when the one or more louvers 702 are integrated with the heat exchanger 200, in addition to heat transfer benefits provided by the heat exchanger 200, FOD, OOD, and/or ice particles, etc. screening benefits are also provided by the one or more louvers 702.

Figures 8A, 8B:
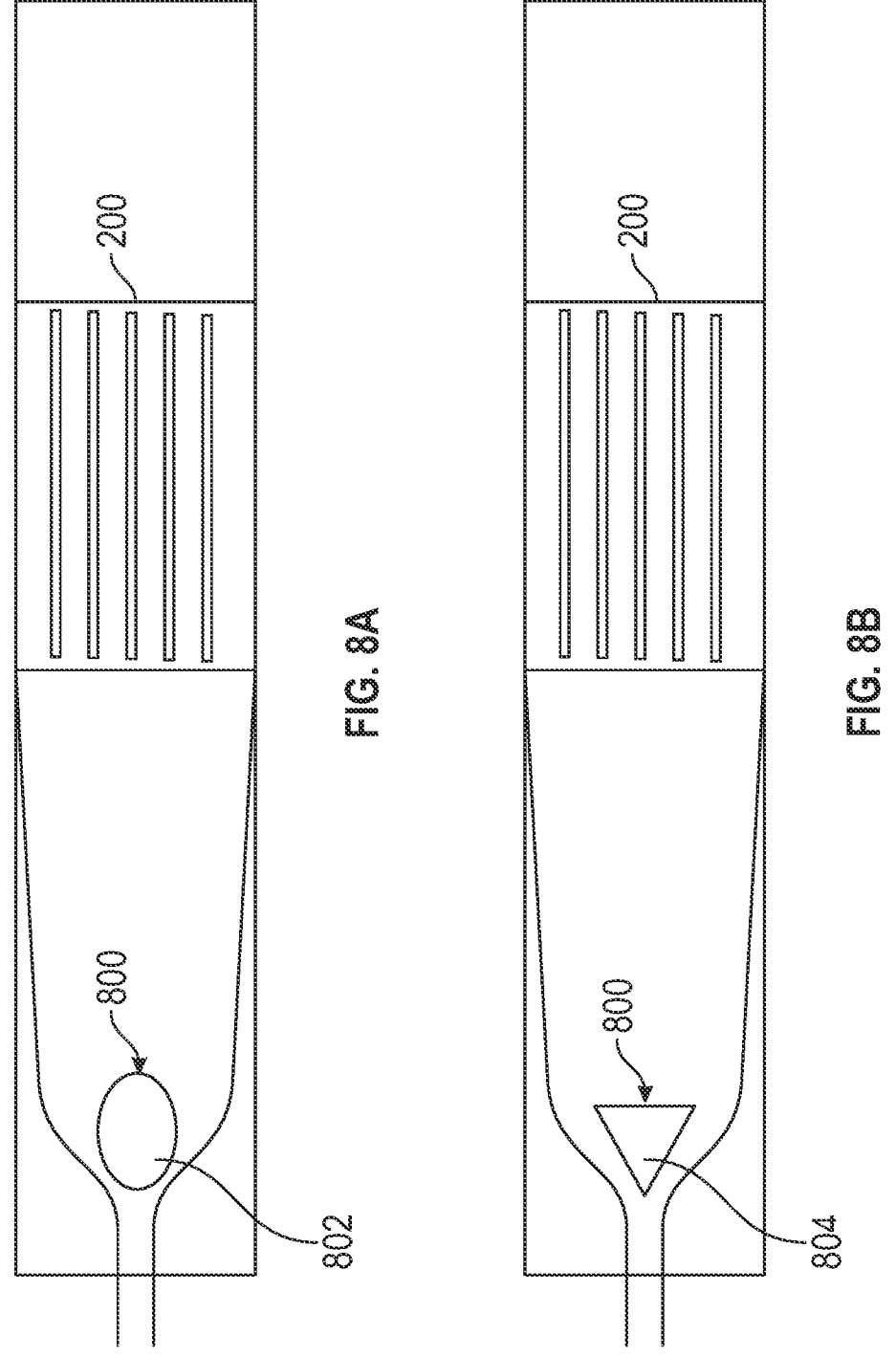
FIGS. 8A and 8B are schematic views of the particle separation system and heat exchanger, according to embodiments of the present disclosure.

FIGS. 8A and 8B are schematic views of a particle separation system 800 and the heat exchanger 200, according to embodiments of the present disclosure. As shown in FIGS. 8A and 8B, the particle separation system 800 includes at least one inertial particle separator 802 or at least one inertial separator 804. The at least one inertial particle separator 802 can be a mass having an oval or rounded shape. The at least one inertial separator 804 can have a triangular shape or pointed shape (e.g., a wedge). The at least one inertial separator can also be one or more louvers as described in the above paragraphs.

Figures 9A, 9B:
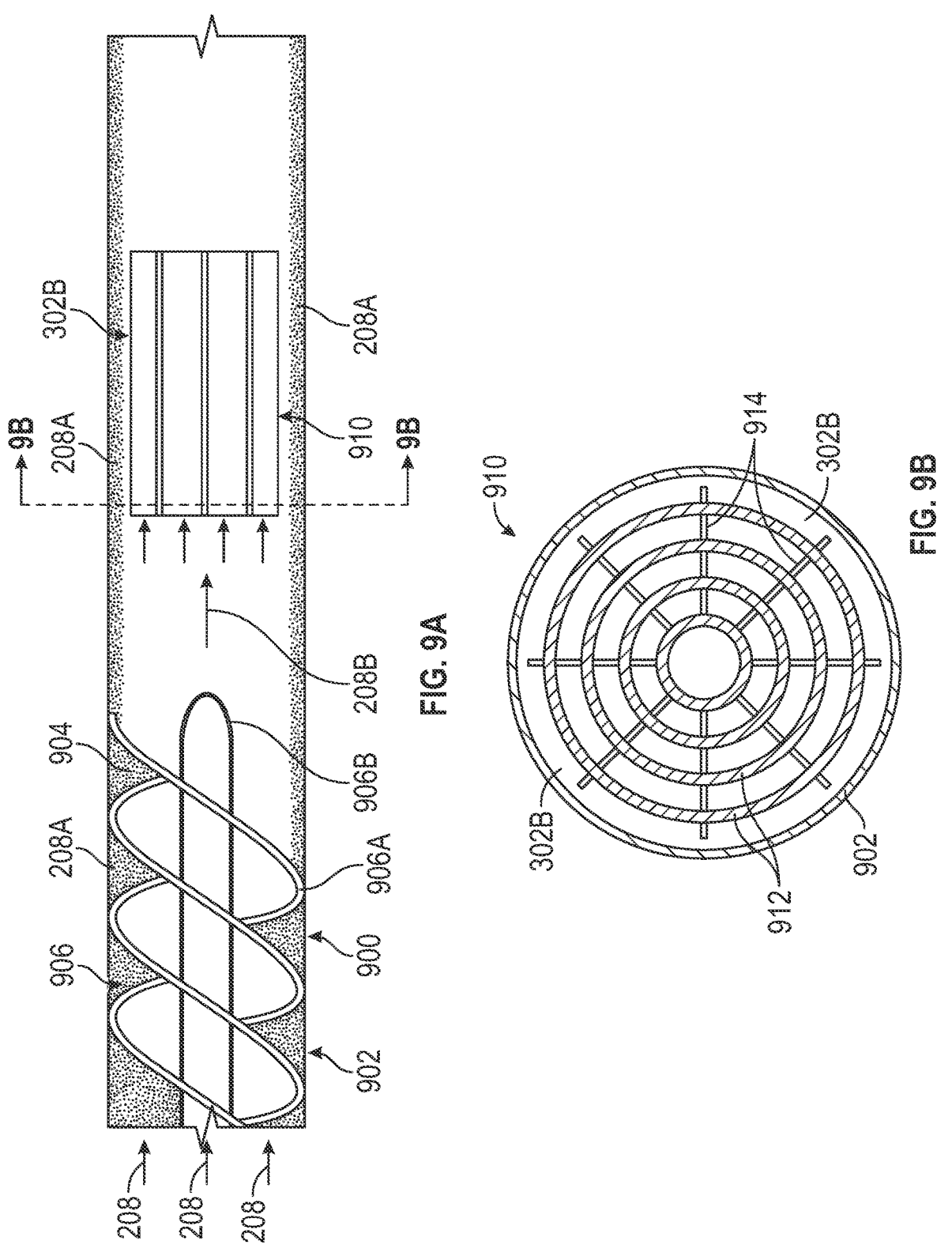
FIG. 9A is a schematic view of the particle separation system and heat exchanger, according to another embodiment of the present disclosure.
FIG. 9B is a schematic cross-sectional view of the heat exchanger taken at cross section line 9B-9B in FIG. 9A, according to an embodiment of the present disclosure.

FIG. 9A is a schematic view of a particle separation system 900 and a heat exchanger 910, according to another embodiment of the present disclosure. As shown in FIG. 9A, the particle separation system 900 is a cyclonic separator. The particle separation system 900 is provided upstream of the heat exchanger 910. The particle separation system 900 receives an incoming airflow 208. The particle separation system 900 includes a housing 902 defining a circular interior 904 (e.g., circular duct). The particle separation system 900 includes a vortex generator 906 (inertial particle separator) disposed within the housing 902. The vortex generator 906 includes a spiral coil 906A coupled to a shaft 906B. The shaft 906B can be configured to rotate thus rotating the spiral coil 906A. The rotation of the vortex generator 906 moves the particles in the incoming airflow 208 towards the radial outer periphery of the housing 902 by a centrifugal force generated by the rotation of the vortex generator 906 to provide the first airflow 208A containing a first amount of particles. The first airflow 208A containing the first amount of particles travels along the radial outer periphery of the housing 902 and then passes into the radially outer volume of the fan duct 172.

FIG. 9B is a schematic cross-sectional view of the heat exchanger 910 taken at cross section line 9B-9B in FIG. 9A, according to an embodiment of the present disclosure. As shown in FIG. 9B, the first airflow 208A further passes through peripheral channel 302B of the heat exchanger 910. As shown in FIG. 9B, the heat exchanger 910 has the same housing 902 as the particle separation system 900. The heat exchanger 910 also has a plurality of circular plates 912 connected to each other via a plurality fins 914. The plurality of circular plates 912 are spaced apart radially from each other. The plurality of fins 914 are arranged radially and are circumferentially spaced apart (e.g., spaced apart along the circumference C) and are coupled to the plurality of circular plates 912. In an embodiment, at least a portion of the plurality of fins 914 are not coupled to the housing 902 to define the peripheral channel 302B. As shown in FIG. 9A, the first airflow 208A having the first amount of particles travels along the radial outer periphery of the housing 902 and passes through the peripheral channel 302B. As shown in FIG. 9A, the second airflow 208B having a second amount of particles (e.g., the airflow with substantially fewer particles or no particles) is substantially not affected by the centrifugal force generated by the rotation of the vortex generator 906 and is allowed to pass through the vortex generator 906. As a result, the second airflow 208B continues towards the central portion of the heat exchanger 910 to cool down the fluid 309 circulating with the heat exchanger 910. The second amount of particles is substantially less than the first amount of particles. The first amount of particles in the first airflow 208A may have a concentration of particles greater than about 80% of an original concentration of particles in the incoming airflow 208 while the second amount of particles in the second airflow 208B may have a concentration of particles less than about 20% of the original concentration of particles in the incoming airflow 208. The first amount of particles (with a concentration of particles greater than 80%) is, therefore, substantially greater than the second amount of particles (with a concentration of particles less than 20%).

The particle separation system described above redirects dispersed particles (e.g., dust particles, aerosol particles) in the airflow to inner and/or outer passages of the heat exchanger so that the majority of a core of the heat exchanger remains particle-free. Redirecting the particles to inner and outer passages of the heat exchanger can provide many benefits, including:

(1) Directing particles to the generally lower flow regions of the approach airflow for bypassing the heat exchanger does not significantly affect the heat exchanger thermal performance because a majority of the airflow is flowing through the radial central portion of the duct. The outer passages of the heat exchanger participate less strongly in heat transfer than the central passages of the heat exchanger due to the radial flow profile.

(2) Fins of the heat exchanger in inner and outer passages are in general shorter or have a smaller length than fins within the core of the heat exchanger (due to mechanical tolerances with respect to casing) and can have lower heat exchange effectiveness as the fins are connected to one plate rather than two.

Figure 10:
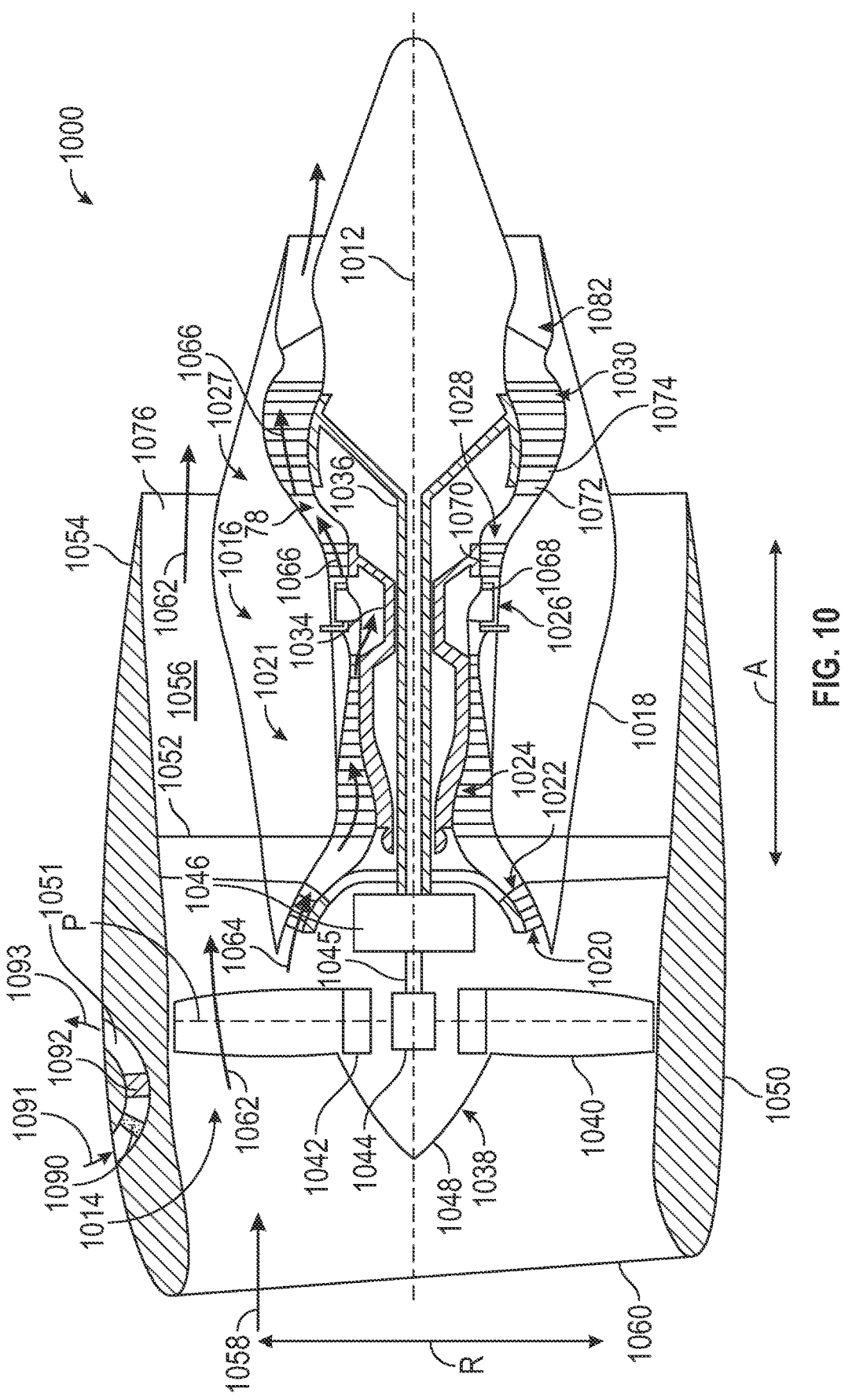
FIG. 10 is a schematic cross-sectional view of a gas turbine engine having a particle separation system positioned upstream of a heat exchanger within a passage of a nacelle of the gas turbine engine such that incoming airflow outside of the nacelle enters the passage within the nacelle, according to another embodiment of the present disclosure.

FIG. 10 is a schematic cross-sectional diagram of a gas turbine engine 1000, according to another embodiment of the present disclosure. As shown in FIG. 10, the gas turbine engine 1000 defines an axial direction A (extending parallel to a longitudinal centerline 1012 provided for reference) and a radial direction R that is normal to the axial direction A. In general, the gas turbine engine 1000 includes a fan section 1014 and a turbo-engine 1016 disposed downstream from the fan section 1014.

The turbo-engine 1016 depicted generally includes an outer casing 1018 that is substantially tubular and defines an annular inlet 1020. As schematically shown in FIG. 10, the outer casing 1018 encases, in serial flow relationship, a compressor section 1021 including a booster or a low pressure (LP) compressor 1022 followed downstream by a high pressure (HP) compressor 1024, a combustion section 1026, a turbine section 1027 including a high pressure (HP) turbine 1028 followed downstream by a low pressure (LP) turbine 1030, and a jet exhaust nozzle section 1032. A high pressure (HP) shaft or spool 1034 drivingly connects the HP turbine 1028 to the HP compressor 1-24 to rotate the HP turbine 1028 and the HP compressor in unison. A low pressure (LP) shaft 1036 drivingly connects the LP turbine 1030 to the LP compressor 1022 to rotate the LP turbine 1030 and the LP compressor 1022 in unison. The compressor section 1021, the combustion section 1026, the turbine section 1027, and the jet exhaust nozzle section 1032 together define a core air flowpath.

For the embodiment depicted in FIG. 10, the fan section 1014 includes a fan 1038 (e.g., a variable pitch fan) having a plurality of fan blades 1040 coupled to a disk 1042 in a spaced apart manner. As depicted in FIG. 10, the fan blades 1040 extend outwardly from the disk 1042 generally along the radial direction R. Each fan blade 1040 is rotatable relative to the disk 1042 about a pitch axis P by virtue of the fan blades 1040 being operatively coupled to an actuation member 1044 configured to collectively vary the pitch of the fan blades 1040 in unison. The fan blades 1040, the disk 1042, and the actuation member 1044 are together rotatable about the longitudinal centerline 1012 via a fan shaft 1045 that is powered by the LP shaft 1036 across a power gearbox 1046. The power gearbox 1046 includes a plurality of gears for adjusting the rotational speed of the fan shaft 1045 and, thus, the fan 1038 relative to the LP shaft 1036 to a more efficient rotational fan speed.

Referring still to the exemplary embodiment of FIG. 10, the disk 1042 is covered by a rotatable fan hub 1048 aerodynamically contoured to promote an airflow through the plurality of fan blades 1040. In addition, the fan section 1014 includes an annular fan casing or a nacelle 1050 that circumferentially surrounds the fan 1038 and/or at least a portion of the turbo-engine 16. The nacelle 1050 is supported relative to the turbo-engine 1016 by a plurality of circumferentially spaced outlet guide vanes 1052. Moreover, a downstream section 1054 of the nacelle 1050 extends over an outer portion of the turbo-engine 1016 to define a bypass airflow passage 1056 therebetween.

During operation of the gas turbine engine 1000 a volume of air 1058 enters the gas turbine engine 1000 through an inlet 1060 of the nacelle 1050 and/or the fan section 1014. As the volume of air 1058 passes across the fan blades 1040, a first portion of the air 1062 is directed or routed into the bypass airflow passage 1056, and a second portion of the air 1064 is directed or is routed into the upstream section of the core air flowpath, or, more specifically, into the annular inlet 1020 of the LP compressor 1022. The ratio between the first portion of air 1062 and the second portion of air 1064 is commonly known as a bypass ratio. The pressure of the second portion of air 1064 is then increased as it is routed through the HP compressor 1024 and into the combustion section 1026, where the highly pressurized air is mixed with fuel and burned to provide combustion gases 1066.

The combustion gases 1066 are routed into the HP turbine 1028 and expanded through the HP turbine 1028 where a portion of thermal and/or of kinetic energy from the combustion gases 1066 is extracted via sequential stages of HP turbine stator vanes 1068 that are coupled to the outer casing 1018 and HP turbine rotor blades 1070 that are coupled to the HP shaft or spool 1034, thus causing the HP shaft or the spool 1034 to rotate, thereby supporting operation of the HP compressor 1024. The combustion gases 1066 are then routed into the LP turbine 1030 and expanded through the LP turbine 1030. Here, a second portion of thermal and kinetic energy is extracted from the combustion gases 1066 via sequential stages of LP turbine stator vanes 1072 that are coupled to the outer casing 1018 and LP turbine rotor blades 1074 that are coupled to the LP shaft 1036, thus, causing the LP shaft 1036 to rotate. This thereby supports operation of the LP compressor 1022 and rotation of the fan 1038 via the power gearbox 1046.

The combustion gases 1066 are subsequently routed through the jet exhaust nozzle section 1032 of the turbo-engine 1016 to provide propulsive thrust. Simultaneously, the pressure of the first portion of air 1062 is substantially increased as the first portion of air 1062 is routed through the bypass airflow passage 1056 before being exhausted from a fan nozzle exhaust section 1076 of the gas turbine engine 1000, also providing propulsive thrust. The HP turbine 1028, the LP turbine 1030, and the jet exhaust nozzle section 1032 at least partially define a hot gas path 1078 for routing the combustion gases 1066 through the turbo-engine 1016.

The gas turbine engine 1000 depicted in FIG. 10 is by way of example only. In other exemplary embodiments, the gas turbine engine 1000 may have any other suitable configuration. For example, in other exemplary embodiments, the fan 1038 may be configured in any other suitable manner (e.g., as a fixed pitch fan) and further may be supported using any other suitable fan frame configuration. Moreover, it should be appreciated that, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

In an embodiment, similar to the embodiment shown in FIG. 1, the gas turbine engine 1000 also includes a particle separation system 1090 disposed upstream of the heat exchanger 1092. The particle separation system 1090 can be similar to the particle separation system 197, 204, 205, 700, 800, 802, 804, 900 described above. The heat exchanger 1092 can be similar to the heat exchanger 198, 199, 200, 202 described above. While in the embodiment shown in FIG. 1, the heat exchanger 198 and the particle separation system 197 are provided in an annular configuration, in the embodiment shown in FIG. 10, the heat exchanger 1092 and the particle separation system 1090 are provided in a non-annular configuration. In FIG. 1, the heat exchanger 198 and the particle separation system 197 are annular and located at a radial position relative to the longitudinal centerline axis 112 and extend circumferentially in the circumferential direction around the longitudinal centerline axis 112. Whereas, in FIG. 10, the particle separation system 1090 and the heat exchanger 1092 are located at a radial position relative to the longitudinal centerline axis 112 but do not extend circumferentially in the circumferential direction around the longitudinal centerline axis 112.

As shown in FIG. 10, the particle separation system 1090 and the heat exchanger 1092 are provided within the nacelle 1050 (i.e., the nacelle wall) and can be located at any position within the circumferential direction. The particle separation system 1090 is disposed upstream of the heat exchanger 1092. The particle separation system 1090 and the heat exchanger 1092 are positioned within a passage 1051 of the nacelle 1050 such that incoming airflow 1091 outside of the nacelle 1050 enters the passage 1051 within the nacelle 1050 to first encounter the particle separation system 1090. The particle separation system 1090 is configured to separate particles present in the incoming airflow 1091 to provide cleaner airflow (airflow containing substantially less particles). The cleaner airflow then continues towards the heat exchanger 1092 to cool down a fluid (not shown in FIG. 10) circulating within the heat exchanger 1092 before exiting as output airflow 1093 to outside of the nacelle 1050 (i.e., outside of the wall of the nacelle 1050).

Figure 11:
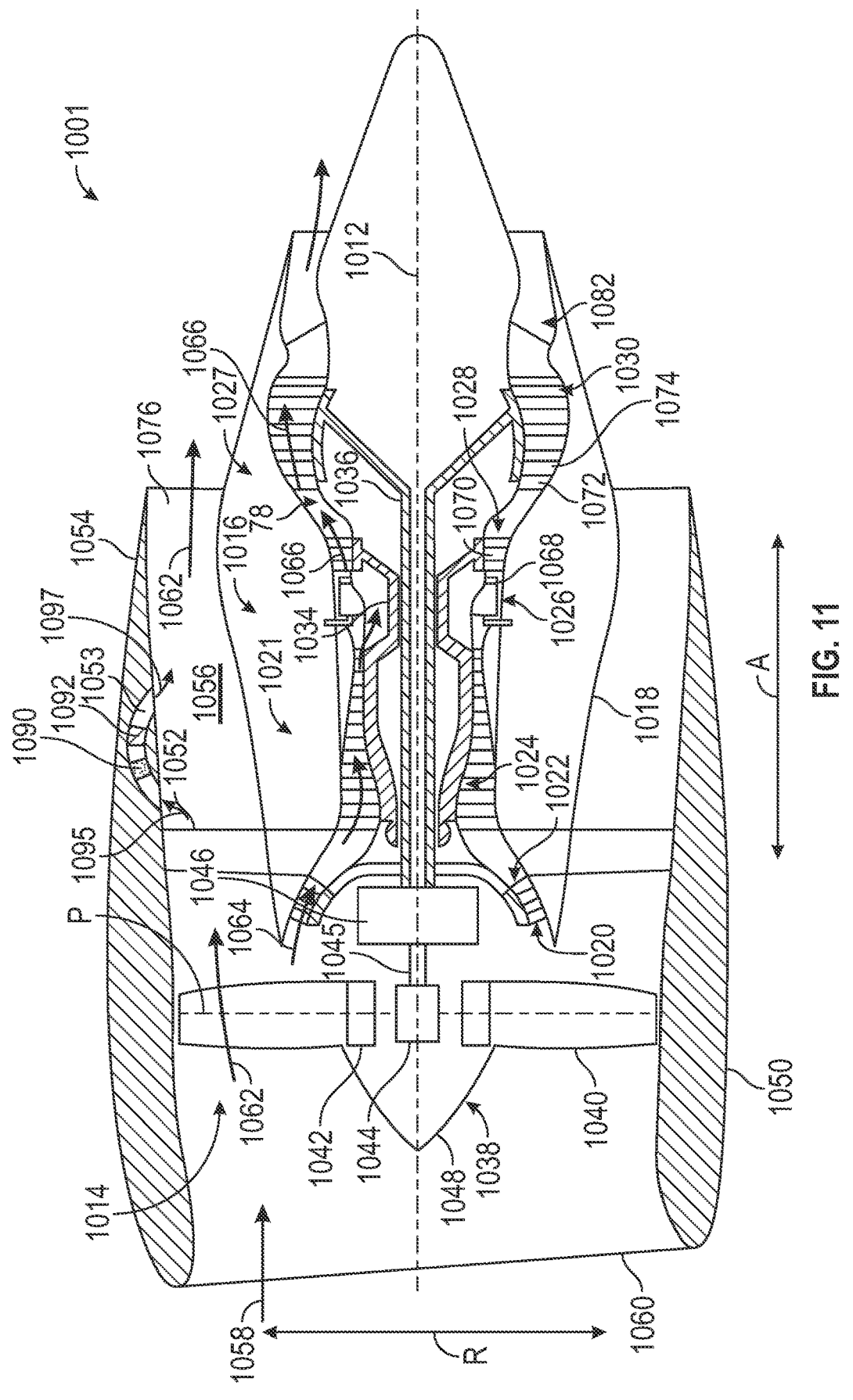
FIG. 11 is a schematic cross-sectional view of a gas turbine engine having a particle separation system positioned upstream of a heat exchanger within a passage of the nacelle of the gas turbine engine such that incoming airflow inside of the nacelle enters the passage within the nacelle, according to another embodiment of the present disclosure.

FIG. 11 is a schematic cross-sectional view of a gas turbine engine, according to another embodiment of the present disclosure. In an embodiment, similar to the embodiment shown in FIG. 10, the gas turbine engine 1001 also includes the particle separation system 1090 disposed upstream of the heat exchanger 1092. The particle separation system 1090 can be similar to the particle separation system 197, 204, 205, 700, 800, 802, 804, 900 described above. The heat exchanger 1092 can be similar to the heat exchanger 198, 199, 200, 202 described above. As shown in FIG. 11, similar to the embodiment shown in FIG. 10, the particle separation system 1090 and the heat exchanger 1092 are provided within the nacelle 1050 (i.e., with the wall of the nacelle 1050). Similar to the embodiment shown in FIG. 10, the particle separation system 1090 and the heat exchanger 1092 are provided in a non-annular configuration wherein the particle separation system 1090 and the heat exchanger 1092 are located at a radial position relative to the longitudinal centerline axis 112 but do not extend circumferentially in the circumferential direction around the longitudinal centerline axis 112. The particle separation system 1090 and the heat exchanger 1092 are provided within the nacelle 1050 (i.e., the nacelle wall) and can be located at any position within the circumferential direction.

The particle separation system 1090 is disposed upstream of the heat exchanger 1092. The particle separation system 1090 and the heat exchanger 1092 are positioned within a passage 1053 of the nacelle 1050 (within the wall of the nacelle) such that incoming airflow 1095 inside of the nacelle 1050 enters the passage 1053 within the nacelle 1050 to first encounter the particle separation system 1090. The particle separation system 1090 is configured to separate particles present in the incoming airflow 1091 to provide cleaner airflow (airflow having substantially less particles). The cleaner airflow then continues towards the heat exchanger 1092 to cool down a fluid (not shown in in FIG. 11) circulating within the heat exchanger 1092 before exiting as output airflow 1097 to inside of the nacelle 1050. The incoming airflow 1095 can be part of the first portion of air 1062.

Figure 12:
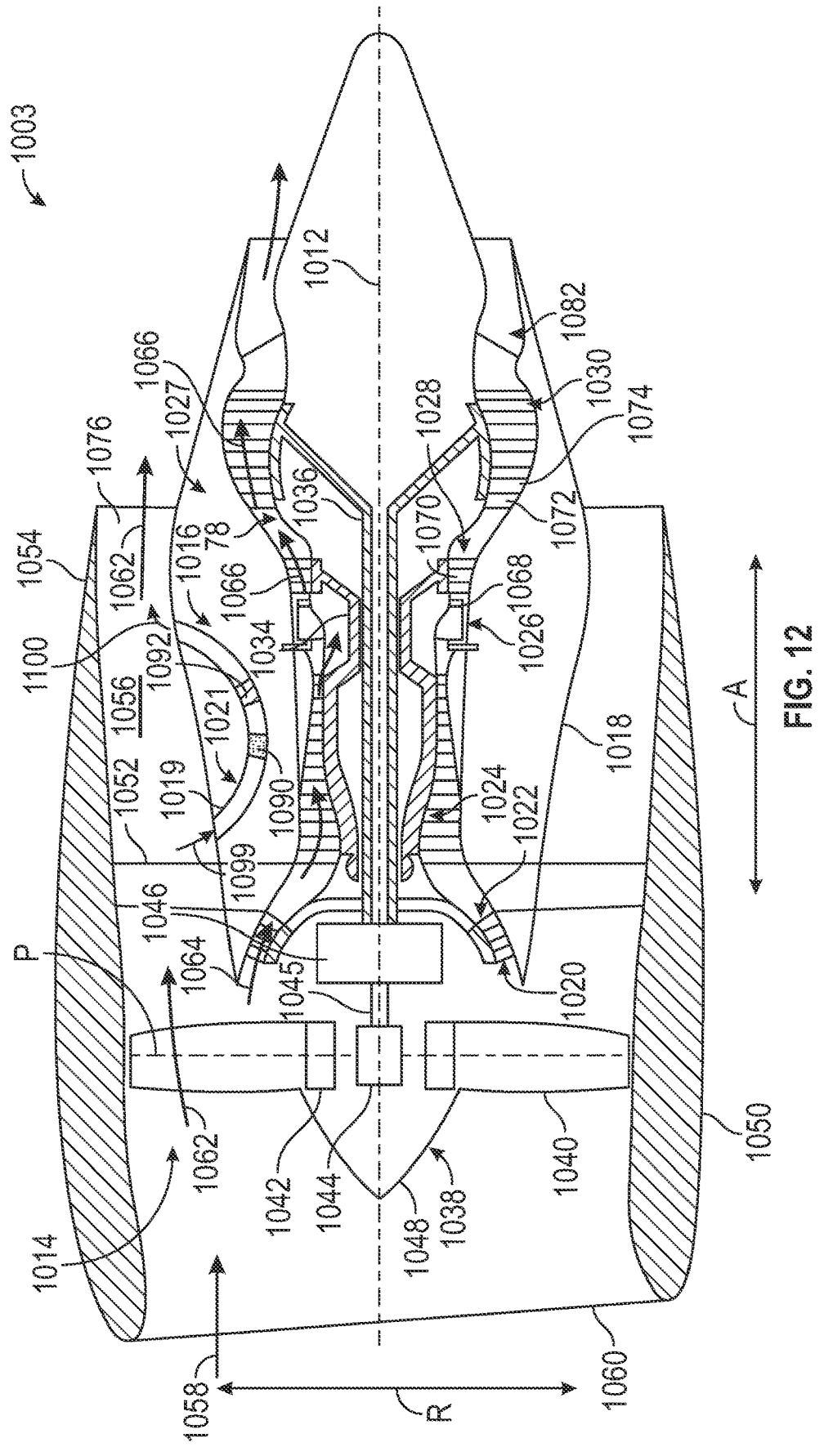
FIG. 12 is a schematic cross-sectional view of a gas turbine engine having a particle separation system positioned upstream of a heat exchanger inside a passage within an outer casing of a turbo-engine of the gas turbine engine such that incoming airflow inside of the nacelle enters the passage of the outer casing of the turbo-engine, according to another embodiment of the present disclosure.

FIG. 12 is a schematic cross-sectional view of a gas turbine engine, according to another embodiment of the present disclosure. In an embodiment, similar to the embodiment shown in FIG. 1, the gas turbine engine 1003 also includes the particle separation system 1090 disposed upstream of the heat exchanger 1092. The particle separation system 1090 can be similar to the particle separation system 197, 204, 205, 700, 800, 802, 804, 900 described above. The heat exchanger 1092 can be similar to the heat exchanger 198, 199, 200, 202 described above. As shown in FIG. 12, the particle separation system 1090 and the heat exchanger 1092 are provided within the outer casing 1018 of the turbo-engine 1016. Similar to the embodiment shown in FIGS. 10 and 11, the particle separation system 1090 and the heat exchanger 1092 are provided in a non-annular configuration wherein the particle separation system 1090 and the heat exchanger 1092 are located at a radial position relative to the longitudinal centerline axis 112 but do not extend circumferentially in the circumferential direction around the longitudinal centerline axis 112. The particle separation system 1090 and the heat exchanger 1092 are provided within the outer casing 1018 of the turbo-engine 1016 and can be located at any position within the circumferential direction.

The particle separation system 1090 is disposed upstream of the heat exchanger 1092. The particle separation system 1090 and the heat exchanger 1092 are positioned within a passage 1019 of the outer casing 1018 of the turbo-engine 1016 such that incoming airflow 1099 inside of the nacelle 1050 (which corresponds to a portion of first portion of air 1062) enters the passage 1019 of the outer casing 1018 of the turbo-engine 1016 to first encounter the particle separation system 1090. The particle separation system 1090 is configured to separate particles present in the incoming airflow 1091 to provide cleaner airflow (airflow having substantially less particles). The cleaner airflow then continues towards the heat exchanger 1092 to cool down a fluid (not shown in in FIG. 10) circulating within the heat exchanger 1092 before exiting as output airflow 1100 to inside of the nacelle 1050. The incoming airflow 1099 can be part of the first portion of air 1062. The output airflow 1100 can also be part of the first portion of air 1062.

As shown in FIGS. 10, 11, and 12, the particle separation system 1090 and the heat exchanger 1092 can be placed at various locations with the gas turbine engine 1000, 1001, 1003. The particle separation system 1090 and the heat exchanger 1092 can also be provided at any one or more of the locations shown in FIGS. 10, 11 and 12. For example, the particle separation system 1090 together with the heat exchanger 1092 can be provided at each of the locations shown in FIGS. 10, 11 and 12.

Further aspects are provided by the subject matter of the following clauses.

A particle separation system includes at least one inertial particle separator spaced apart from a heat exchanger, or integrated as a unitary piece with the heat exchanger, the at least one inertial particle separator being disposed upstream of the heat exchanger. The one or more inertial particle separator is configured and arranged to direct a first fluid flow containing a first amount of particles to an inner passage provided at a hub of the heat exchanger, an outer passage provided at a tip of the heat exchanger, or both, the hub and the tip being located at a radial periphery of the heat exchanger, and to direct a second fluid flow containing substantially no particles or a second amount of particles to a central portion of the heat exchanger to cool down a fluid circulating within the heat exchanger, the second amount of particles being substantially less than the first amount of particles.

The particle separation system of the preceding clause 2, wherein the first amount of particles in the first fluid flow has a concentration of particles greater than about 80% an original concentration of particles in an incoming fluid flow incident on the particle separation system and the second fluid flow has a concentration of particles less than about 20% the original concentration of particles in the incoming fluid flow incident on the particle separation system.

The particle separation system of any preceding clause, wherein the at least one inertial particle separator includes one or more masses, the one or more masses being disposed upstream of the heat exchanger, the one or more masses having a shape selected to deflect the first fluid flow containing the first amount of particles to the inner passage provided at the hub of the heat exchanger, the outer passage provided at the tip of the heat exchanger, or both.

The particle separation system of any preceding clause, wherein the shape is triangular, pointed, oval, or rounded.

The particle separation system of any preceding clause, wherein the at least one inertial particle separator includes one or more louvers spaced apart from the heat exchanger or integrated as a unitary piece with the heat exchanger, the one or more louvers being disposed upstream of the heat exchanger. The one or more louvers are configured and arranged to direct the first fluid flow containing the first amount of particles to the inner passage provided at the hub of the heat exchanger, the outer passage provided at the tip of the heat exchanger, or both, and to direct the second fluid flow containing substantially no particles or the second amount of particles to the central portion of the heat exchanger to cool down the fluid circulating within the heat exchanger.

The particle separation system of the preceding clause, further including an actuator configured to actuate the one or more louvers. The one or more louvers are mounted to the heat exchanger and are rotatable using the actuator.

The particle separation system of any preceding clause, wherein the at least one louver includes a first louver oriented at a first angle relative to an axial direction of the heat exchanger and a second louver oriented at a second angle relative to the axial direction of the heat exchanger, the first angle being different from the second angle, wherein the first angle and the second angle are adjustable to enhance efficiency of separating particles.

The particle separation system of the preceding clause, wherein the first louver and the second louver are spaced apart from each other and a distance separating the first louver and the second louver is adjustable to enhance an efficiency of separating particles.

The particle separation system of any preceding clause, wherein the at least one louver includes one or more passages configured to circulate the fluid circulating within the heat exchanger to cool down the fluid.

The particle separation system of any preceding clause, wherein the at least one louver having the one or more passages is further configured to melt ice particles in an incoming fluid flow incident on the particle separation system and to limit exposure of the heat exchanger to the ice particles.

The particle separation system of any preceding clause, further including a housing defining an circular interior, wherein the at least one inertial particle separator includes a vortex generator disposed within the housing, the vortex generator including a spiral coil coupled to a shaft that is configured to rotate the spiral coil, wherein the vortex generator is configured to move particles in an incoming airflow incident on the particle separator system towards a radial outer periphery of the housing by a centrifugal force generated by a rotation of the vortex generator to provide a first airflow containing a first amount of particles and to allow a second airflow having a second amount of particles to pass through the vortex generator to continue towards a heat exchanger to cool down a fluid circulating within the heat exchanger.

A particle separation system includes a housing defining an circular interior, and a vortex generator disposed within the housing. The vortex generator includes a spiral coil coupled to a shaft that is configured to rotate the spiral coil. The vortex generator is configured to move particles in an incoming fluid flow incident on the particle separation system towards a radial outer periphery of the housing by a centrifugal force generated by a rotation of the vortex generator to provide a first fluid flow containing a first amount of particles and to allow a second fluid flow having a second amount of particles to pass through the vortex generator to continue towards a heat exchanger to cool down a fluid circulating within the heat exchanger.

The particle separation system of the preceding clause, wherein the first amount of particles in the first fluid flow has a concentration of particles greater than about 80% an original concentration of particles in an incoming fluid flow incident on the particle separation system and the second fluid flow has a concentration of particles less than about 20% the original concentration of particles in the incoming fluid flow incident on the particle separation system.

A gas turbine engine includes a heat exchanger and a particle separation system including at least one inertial particle separator spaced apart from the heat exchanger or integrated as a unitary piece with the heat exchanger, the at least one inertial particle separator being disposed upstream of the heat exchanger. The at least one inertial particle separator is configured and arranged to direct a first fluid flow containing a first amount of particles to an inner passage provided at a hub of the heat exchanger, an outer passage provided at a tip of the heat exchanger, or both, the hub and the tip being located at a radial periphery of the heat exchanger, and to direct a second fluid flow containing substantially no particles or a second amount of particles to a central portion of the heat exchanger to cool down a fluid circulating within the heat exchanger, the second amount of particles being substantially less than the first amount of particles.

The gas turbine engine of the preceding clause, wherein the first amount of particles in the first fluid flow has a concentration of particles greater than about 80% an original concentration of particles in an incoming fluid flow incident on the particle separation system and the second fluid flow has a concentration of particles less than about 20% the original concentration of particles in the incoming fluid flow incident on the particle separation system.

The gas turbine engine of any preceding clause, wherein the at least one inertial particle separator includes one or more masses, the one or more masses being disposed upstream of the heat exchanger, the one or more masses having a shape selected to deflect the first fluid flow containing the first amount of particles to the inner passage provided at the hub of the heat exchanger, the outer passage provided at the tip of the heat exchanger, or both.

The gas turbine engine of any preceding clause, wherein the at least one inertial particle separator includes one or more louvers spaced apart from the heat exchanger or integrated as a unitary piece with the heat exchanger, the one or more louvers being disposed upstream of the heat exchanger. The one or more louvers are configured and arranged to direct the first fluid flow containing the first amount of particles to the inner passage provided at the hub of the heat exchanger, the outer passage provided at the tip of the heat exchanger, or both, and to direct the second fluid flow containing substantially no particles or the second amount of particles to the central portion of the heat exchanger to cool down the fluid circulating within the heat exchanger.

The gas turbine engine of the preceding clause, wherein the at least one louver includes a first louver oriented at a first angle relative to an axial direction of the heat exchanger and a second louver oriented at a second angle relative to the axial direction of the heat exchanger, the first angle being different from the second angle, wherein the first angle and the second angle are adjustable to enhance efficiency of separating particles.

The gas turbine engine of any preceding clause, wherein the first louver and the second louver are spaced apart from each other and a distance separating the first louver and the second louver is adjustable to enhance an efficiency of separating particles.

The gas turbine engine of any preceding clause, wherein the at least one louver includes one or more passages configured to circulate the fluid circulating within the heat exchanger to cool down the fluid.

The gas turbine engine of any preceding clause, wherein the at least one louver having the one or more passages is further configured to melt ice particles in an incoming fluid flow incident on the particle separation system and limit exposure of the heat exchanger to the ice particles.

The gas turbine engine of any preceding clause, wherein the heat exchanger and the particle separation system are provided within a nacelle of the gas turbine engine.

The gas turbine engine of any preceding clause, wherein the particle separation system is positioned upstream of the heat exchanger within a passage of the nacelle such that incoming fluid flow outside of the nacelle enters the passage within the nacelle to first encounter the particle separation system to provide cleaner fluid flow that continues towards the heat exchanger to cool down a fluid circulating within the heat exchanger before exiting as output fluid flow to outside of the nacelle.

The gas turbine engine of any preceding clause, wherein the particle separation system is positioned upstream of the heat exchanger within a passage of the nacelle such that incoming fluid flow inside of the nacelle enters the passage within the nacelle to first encounter the particle separation system to provide cleaner fluid flow that continues towards the heat exchanger to cool down a fluid circulating within the heat exchanger before exiting as output fluid flow to inside of the nacelle.

The gas turbine engine of any preceding clause, wherein the particle separation system is positioned upstream of the heat exchanger inside a passage within an outer casing of a turbo-engine of the gas turbine engine such that incoming fluid flow inside of the nacelle enters the passage of the outer casing of the turbo-engine to first encounter the particle separation system to provide cleaner fluid flow that continues towards the heat exchanger to cool down a fluid circulating within the heat exchanger before exiting as output fluid flow to inside of the nacelle.

A method of separating particles in a fluid flow, the method includes disposing a particle separator upstream of a heat exchanger, directing with the particle separator a first fluid flow containing a first amount of particles to an inner passage provided at a hub of the heat exchanger, an outer passage provided at a tip of the heat exchanger, or both, the hub and the tip being located at a radial periphery of the heat exchanger, and directing a second fluid flow containing substantially no particles or a second amount of particles to a central portion of the heat exchanger to cool down a fluid circulating within the heat exchanger, the second amount of particles being substantially less than the first amount of particles.

A method of separating particles in a fluid flow, the method includes disposing a vortex generator within a housing defining an circular interior, the vortex generator comprising a spiral coil coupled to a shaft that is configured to rotate the spiral coil, rotating the spiral coil, moving particles in an incoming fluid flow towards a radial outer periphery of the housing by a centrifugal force generated by the rotation of the spiral coil to provide a first fluid flow containing a first amount of particles, and passing a second fluid flow having a second amount of particles through the vortex generator to continue towards a heat exchanger to cool down a fluid circulating within the heat exchanger.

The term "fluid" is used herein broadly to include air or any other gas or a liquid, or a combination of a gas (e.g., air) and a liquid.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

We claim:

1. A particle separation system comprising:
at least one inertial particle separator spaced apart from a heat exchanger or integrated as a unitary piece with the heat exchanger, the at least one inertial particle separator being disposed upstream of the heat exchanger, wherein the at least one inertial particle separator is configured and arranged:
to direct a first fluid flow containing a first amount of particles to an inner passage provided at a hub of the heat exchanger, an outer passage provided at a tip of the heat exchanger, or both, the hub and the tip being located at a radial periphery of the heat exchanger, and
to direct a second fluid flow containing substantially no particles or a second amount of particles to a central portion of the heat exchanger to cool down a fluid circulating within the heat exchanger, the second amount of particles being substantially less than the first amount of particles,
wherein the at least one inertial particle separator comprises one or more louvers spaced apart from the heat exchanger or integrated as a unitary piece with the heat exchanger, the one or more louvers being disposed upstream of the heat exchanger,
wherein the one or more louvers is configured and arranged:
to direct the first fluid flow containing the first amount of particles to the inner passage provided at the hub of the heat exchanger, the outer passage provided at the tip of the heat exchanger, or both, and
to direct the second fluid flow containing substantially no particles or the second amount of particles to the central portion of the heat exchanger to cool down the fluid circulating within the heat exchanger.

2. The particle separation system according to claim 1, wherein the first amount of particles in the first fluid flow has a concentration of particles greater than 80% an original concentration of particles in an incoming fluid flow incident on the particle separation system and the second fluid flow has a concentration of particles less than 20% the original concentration of particles in the incoming fluid flow incident on the particle separation system.

3. The particle separation system according to claim 1, further comprising an actuator configured to actuate the one or more louvers, wherein the one or more louvers are mounted to the heat exchanger and are rotatable using the actuator.

4. The particle separation system according to claim 1, wherein the one or more louvers comprises a first louver oriented at a first angle relative to an axial direction of the heat exchanger and a second louver oriented at a second angle relative to the axial direction of the heat exchanger, the first angle being different from the second angle, wherein the first angle and the second angle are adjustable to enhance an efficiency of separating particles.

5. The particle separation system according to claim 4, wherein the first louver and the second louver are spaced apart from each other and a distance separating the first louver and the second louver is adjustable to enhance the efficiency of separating particles.

6. The particle separation system according to claim 1, wherein the one or more louvers comprises one or more passages configured to circulate the fluid circulating within the heat exchanger to cool down the fluid.

7. The particle separation system according to claim 6, wherein the one or more louvers having the one or more passages is further configured to melt ice particles in an incoming fluid flow incident on the particle separation system and limit exposure of the heat exchanger to the ice particles.

8. A gas turbine engine comprising:

a heat exchanger; and a particle separation system comprising at least one inertial particle separator spaced apart from the heat exchanger or integrated as a unitary piece with the heat exchanger, the at least one inertial particle separator being disposed upstream of the heat exchanger, wherein the at least one inertial particle separator is configured and arranged:

to direct a first fluid flow containing a first amount of particles to an inner passage provided at a hub of the heat exchanger, an outer passage provided at a tip of the heat exchanger, or both, the hub and the tip being located at a radial periphery of the heat exchanger; and to direct a second fluid flow containing substantially no particles or a second amount of particles to a central portion of the heat exchanger to cool down a fluid circulating within the heat exchanger, the second amount of particles being substantially less than the first amount of particles, wherein the at least one inertial particle separator comprises one or more louvers spaced apart from the heat exchanger or integrated as a unitary piece with the heat exchanger, the one or more louvers being disposed upstream of the heat exchanger, wherein the one or more louvers are configured and arranged:

to direct the first fluid flow containing the first amount of particles to the inner passage provided at the hub of the heat exchanger, the outer passage provided at the tip of the heat exchanger, or both; and to direct the second fluid flow containing substantially no particles or the second amount of particles to the central portion of the heat exchanger to cool down the fluid circulating within the heat exchanger.

9. The gas turbine engine according to claim 8, wherein the first amount of particles in the first fluid flow has a concentration of particles greater than 80% an original concentration of particles in an incoming fluid flow incident on the particle separation system and the second fluid flow has a concentration of particles less than 20% the original concentration of particles in the incoming fluid flow incident on the particle separation system.

10. The gas turbine engine according to claim 8, wherein the one or more louvers comprises a first louver oriented at a first angle relative to an axial direction of the heat exchanger and a second louver oriented at a second angle relative to the axial direction of the heat exchanger, the first angle being different from the second angle, wherein the first angle and the second angle are adjustable to enhance an efficiency of separating particles.

11. The gas turbine engine according to claim 10, wherein the first louver and the second louver are spaced apart from each other and a distance separating the first louver and the second louver is adjustable to enhance the efficiency of separating particles.

12. The gas turbine engine according to claim 8, wherein the one or more louvers comprises one or more passages configured to circulate the fluid circulating within the heat exchanger to cool down the fluid.

13. The gas turbine engine according to claim 12, wherein the one or more louvers having the one or more passages is further configured to melt ice particles in an incoming fluid flow incident on the particle separation system and limit exposure of the heat exchanger to the ice particles.

\* \* \* \* \*